(12) United States Patent
Kim

(10) Patent No.: US 6,342,742 B1
(45) Date of Patent: Jan. 29, 2002

(54) VIBRATOR

(75) Inventor: Jong-Kyu Kim, Seoul (KR)

(73) Assignee: Won-II Communics Co., Ltd., Seoul (KR)

( * ) Notice: Subject to any disclaimer, the term of this patent is extended or adjusted under 35 U.S.C. 154(b) by 0 days.

(21) Appl. No.: 09/625,819

(22) Filed: Jul. 26, 2000

(30) Foreign Application Priority Data

Jan. 4, 2000 (KR) ............................................ 2000-142

(51) Int. Cl.[7] .......................... H02K 7/06; H02K 11/00; H02K 1/12
(52) U.S. Cl. ............................ 310/81; 310/71; 310/89; 310/91; 310/258
(58) Field of Search .............................. 310/71, 81, 80, 310/89, 91, 254, 258, 259, 40 MM; 340/7.6, 407.1

(56) References Cited

U.S. PATENT DOCUMENTS

| | | | | |
|---|---|---|---|---|
| 4,852,245 A | * | 8/1989 | Denk | 29/596 |
| 4,968,911 A | * | 11/1990 | Denk | 310/42 |
| 5,107,155 A | * | 4/1992 | Yamaguchi | 310/81 |
| 5,373,207 A | * | 12/1994 | Yamaguchi et al. | 310/81 |
| 5,379,032 A | * | 1/1995 | Foster et al. | 340/825.46 |
| 5,668,423 A | * | 9/1997 | You et al. | 310/81 |
| 6,013,963 A | * | 1/2000 | Shelton, Jr. | 310/176 |
| 6,057,753 A | * | 5/2000 | Myers | 340/407.1 |
| 6,274,955 B1 | * | 8/2001 | Satoh et al. | 310/71 |

* cited by examiner

Primary Examiner—Nestor Ramirez
Assistant Examiner—Dang Dinh Le
(74) Attorney, Agent, or Firm—Fulbright & Jaworski LLP

(57) ABSTRACT

Disclosed is a vibrator including: a rotary member having a center plate and a unipolar magnet of an arc shape eccentrically disposed on the outer surface of the center plate, the center plate having a through hole formed in the center; a shaft inserted into the through hole of the center plate; a pair of bobbins divided into upper and lower bobbins, each bobbin having a confined space and a support hole, wherein the rotary member is rotated within the confined space and the shaft is inserted into the support holes to thereby rotate the rotary member; and a coil wound on the bobbins connected with each other, the coil generating a magnetic force with the polarity opposite to that of the magnet. The vibrator, which is embedded in communication equipments, such as mobile phones and radio pagers, generates a strong power of vibration using a low electric power.

48 Claims, 35 Drawing Sheets

VIBRATOR

BACKGROUND OF THE INVENTION

1. Field of the Invention

The present invention relates generally to a vibrator embedded in communication products such as mobile phones, radio pagers or the likes, and more particularly, to a vibrator, which is vibrated when a telephone call is received, thereby informing a user of the telephone call.

2. Description of the Related Art

Recently, mobile phones and radio pagers are widely used according to the development of telecommunication equipments and users' desire of information. Furthermore, according to the trend of high-sensitivity of electronic parts with the development of the electronics industry, portable information terminals embedding the portable pager are utilized for multipurpose.

As a method for notifying the user of a call receiving state of the radio pager or the mobile phone, sound signal or a vibrator is used.

When message or call signal is detected, a motor of the vibrator is operated, thereby vibrating the radio pager or the mobile phone to notify the user of the call receiving state.

The conventional vibrator of the above type includes a motor and an eccentric shaft extending from a motor shaft. However, the vibrator occupies a large confined space and requires a lot of power consumption since the motor and the eccentric shaft are separated from each other.

SUMMARY OF THE INVENTION

It is, therefore, an object of the present invention to provide a vibrator, which is reduced in its volume, thereby reducing the sizes of communication equipments such as mobile phones or radio pagers.

It is another object of the present invention to provide a vibrator, which does not use an eccentric shaft connected to a motor but use a magnet as the eccentric shaft, thereby reducing the power consumption.

It is further another object of the present invention to provide a vibrator, which is manufactured in a SMD type (Surface Mounting Device type), so that the vibrator is simply assembled into mobile phones or radio pagers as well as occupies a small confined space in the mobile phones or the radio pagers.

To accomplish the above objects, the present invention provides a vibrator comprising: a rotary member having a center plate that a through hole is formed in the center and a unipolar magnet of an arc shape which is eccentrically disposed on the outer surface of the center plate; a shaft inserted into the through hole of the center plate; a pair of bobbins divided into upper and lower bobbins, each bobbin having a confined space in which the rotary member is located and rotated and a support hole in which the shaft is inserted to thereby rotate the rotary member; and a coil wound on the bobbins connected with each other, the coil generating a magnetic force having a polarity opposite to that of the magnet.

The rotary member, which is made of a Nd (neodymium) magnet or SmCo magnet, also has a plastic magnet embedded in the center thereof, and the plastic magnet has the same polarity as the Nd magnet or the SmCo magnet.

The shaft is inserted into the through hole of the rotary member or formed integrally with the rotary member to fit the rotary member into the bobbins. The shaft is formed in a cylindrical shape tapered at the opposite ends thereof. The cylindrical shaft may have a projection formed on the center circumference thereof which meets with the through hole surface of the center plate and has a gear portion formed on the side surface of the projection. The cylindrical shaft may have a projection formed on the center circumference thereof which meets with the through hole surface of the center plate and has at least one or more plane surfaces formed by completely cutting one or more portions of the projection. The cylindrical shaft may have a projection formed on the center circumference thereof which meets with the through hole surface of the center plate and has at least one or more plane surfaces formed by partially cutting one or more portions of the projection.

In an embodiment of the bobbins, the bobbins include upper and lower bobbins detachably connected with each other. The connected bobbins form a chamber for allowing the rotary member to rotate. Each bobbin has a support hole for inserting the shaft thereinto, screen walls preventing the coil wound on the bobbins from slipping out of the bobbins, and coupling means for coupling integrally the upper and lower bobbins.

The coupling means includes a number fixed jaws formed on corners of the upper bobbin and a number of hooks formed on corners of the lower bobbin in corresponding locations of the fixed jaws.

Each bobbin has air holes formed in both sides to thereby lead the flow of air during the rotation of the rotary member and a boss formed around the support hole, the boss being higher than the inner surface of the bobbin to thereby rotate the rotary member without touching the inner surface of the bobbin. The upper bobbin has holes formed inwardly from the fixed jaws and the lower bobbin has bosses formed inwardly from the hooks, to thereby be coupled with each other when the bobbins are assembled.

Furthermore, a magnetic member is embedded into the outer wall of the upper bobbin or the lower bobbin, so that a stop position of the rotary member can be designated.

In another embodiment of the bobbins, the bobbins include upper and lower bobbins detachably connected with each other. The connected bobbins form a chamber for allowing the rotary member to rotate. Each bobbin has a support hole for inserting the shaft thereinto, screen walls preventing the coil wound on the bobbins from slipping out of the bobbins, waist portions formed at least one or two sides of the bobbins to adjust the number of winding of the coil, and coupling means for coupling integrally the upper and lower bobbins.

The coupling means includes a number fixed jaws formed on corners of the upper bobbin and a number of hooks formed on corners of the lower bobbin in corresponding locations of the fixed jaws.

Each bobbin has air holes on both sides to thereby lead the flow of air during the rotation of the rotary member and a boss formed around the support hole, the boss being higher than the inner surface of the bobbin to thereby rotate the rotary member without touching the inner surface of the bobbin. The upper bobbin has holes formed inwardly from the fixed jaws and the lower bobbin has bosses formed inwardly from the hooks, to thereby be coupled with each other when the bobbins are assembled.

Furthermore, a magnetic member is embedded into the outer wall of the upper bobbin or the lower bobbin, so that a stop position of the rotary member can be designated.

To accomplish the above objects, in another embodiment, the present invention provides a vibrator comprising: a rotary member having a center plate that a through hole is formed in the center and a unipolar magnet of an arc shape which is eccentrically disposed on the outer surface of the center plate; a shaft inserted into the through hole of the center plate; a pair of bobbins divided into upper and lower bobbins, each bobbin having a confined space in which the rotary member is located and rotated and a support hole in which the shaft is inserted to thereby rotate the rotary member; a coil wound on the bobbins connected with each other, the coil generating a magnetic force having a polarity opposite to that of the magnet; a housing wrapping up the bobbins on which the coil is wound, the housing connecting the ends of the coil to an external power supply; and a cap covering the upper portion of the bobbins and fit on the upper surface of the housing.

The rotary member, which is made of a Nd (neodymium) magnet or SmCo magnet, also has a plastic magnet embedded in the center thereof, and the plastic magnet has the same polarity as the Nd magnet or the SmCo magnet.

The shaft is inserted into the through hole of the rotary member or formed integrally with the rotary member to fit the rotary member into the bobbins. The shaft is formed in a cylindrical shape tapered at the opposite ends thereof. The cylindrical shaft may have a projection formed on the center circumference thereof which meets with the through hole surface of the center plate and has a gear portion formed on the side surface of the projection. The cylindrical shaft may have a projection formed on the to center circumference thereof which meets with the through hole surface of the center plate and has at least one or more plane surfaces formed by completely cutting one or more portions of the projection. The cylindrical shaft may have a projection formed on the center circumference thereof which meets with the through hole surface of the center plate and has at least one or more plane surfaces formed by partially cutting one or more portions of the projection.

In an embodiment of the bobbins according to the present invention, the bobbins include upper and lower bobbins detachably connected with each other. The connected bobbins form a confined space for allowing the rotary member to rotate. Each bobbin has a support hole for inserting the shaft thereinto, screen walls preventing the coil wound on the bobbins from slipping out of the bobbins, and coupling means for coupling integrally the upper and lower bobbins.

The coupling means includes a number fixed jaws formed on corners of the upper bobbin and a number of hooks formed on corners of the lower bobbin in corresponding locations of the fixed jaws.

Each bobbin has air holes on both sides to thereby lead the flow of air during the rotation of the rotary member and a boss formed around the support hole, the boss being higher than the inner surface of the bobbin to thereby rotate the rotary member without touching the inner surface of the bobbin. The upper bobbin has holes formed inwardly from the fixed jaws and the lower bobbin has bosses formed inwardly from the hooks, to thereby be coupled with each other when the bobbins are assembled.

Furthermore, a magnetic member is embedded into the outer wall of the upper bobbin or the lower bobbin, so that a stop position of the rotary member can be designated.

In another embodiment of the bobbins according to the present invention, the bobbins include upper and lower bobbins detachable connected with each other. The connected bobbins form a confined space for allowing the rotary member to rotate. Each bobbin has a support hole for inserting the shaft thereinto, screen walls preventing the coil wound on the bobbins from slipping out of the bobbins, waist portions formed at least one or two sides of the bobbins to adjust the number of winding of the coil, and coupling means for coupling integrally the upper and lower bobbins.

The coupling means includes a number fixed jaws formed on corners of the upper bobbin and a number of hooks formed on corners of the lower bobbin in corresponding locations of the fixed jaws.

Each bobbin has air holes on both sides to thereby lead the flow of air during the rotation of the rotary member and a boss formed around the support hole, the boss being higher than the inner surface of the bobbin to thereby rotate the rotary member without touching the inner surface of the bobbin. The upper bobbin has holes formed inwardly from the fixed jaws and the lower bobbin has bosses formed inwardly from the hooks, to thereby be coupled with each other when the bobbins are assembled.

Furthermore, a magnetic member is embedded into the outer wall of the upper bobbin or the lower bobbin, so that a stop position of the rotary member can be designated.

It is preferable that the housing has at least two or more terminals, which are embedded therein, exposed upward and downward from the housing surface and formed integrally with the housing.

Preferably, an extended end of the terminal is bent upwardly wrapping the side of the housing and apart from the cap, which covers the upper surface of the housing, in a predetermined interval.

Additionally, it is preferable that the lower end portion of the cap, which meets with a welding surface of the upper surface of the housing, has a projection for ultrasonic welding.

The cap has a number of guide holes at the lower end portion of the cap and the housing has a number of bosses for inserting into the guide holes of the cap, thereby securely connecting the housing and the cap.

Furthermore, the cap has an air hole formed at a side thereof, thereby leading the smooth flow of air.

BRIEF DESCRIPTION OF THE DRAWINGS

The above and other objects, features and advantages of the present invention will become more apparent from the following detailed description when taken in conjunction with the accompanying drawings in which:

FIG. 4b is a sectional view of FIG. 4a;

FIG. 5b is a sectional view of FIG. 5a;

FIG. 6b is a sectional view of FIG. 6a;

FIG. 8 is a perspective view of a terminal embedded in the housing of FIG. 7a;

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
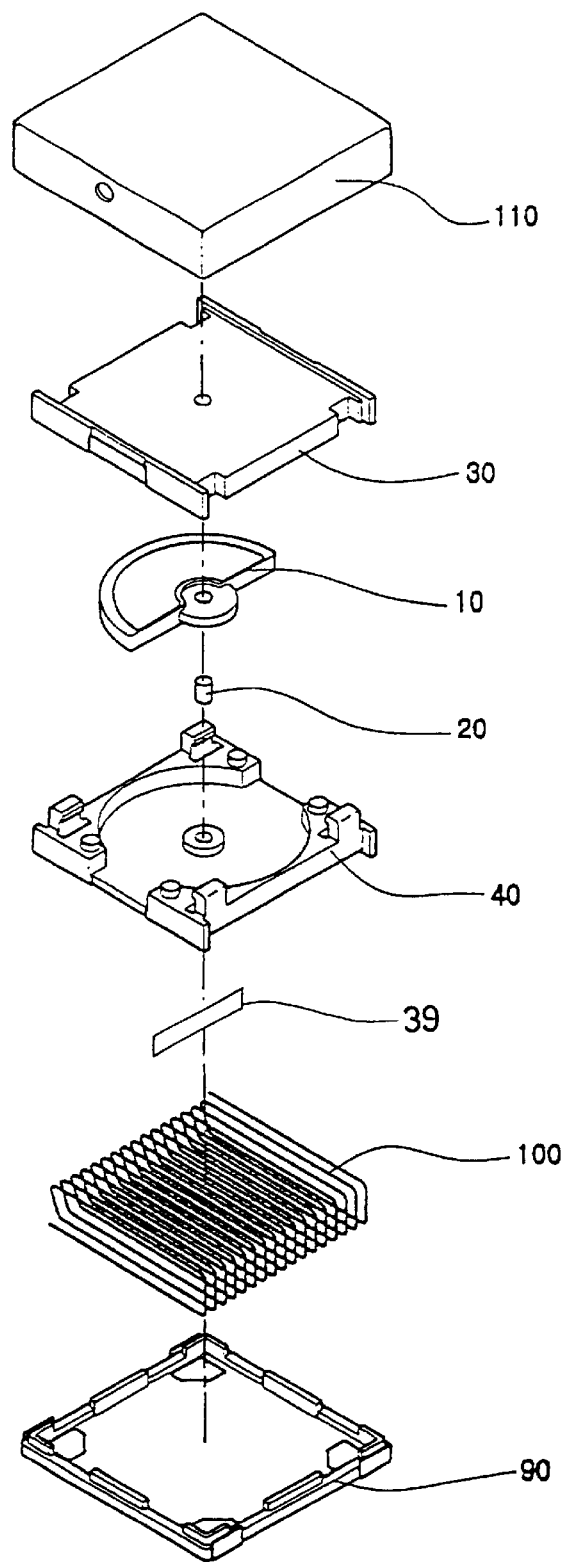
FIG. 1 is an exploded perspective view of a vibrator according to the present invention.

As shown in FIG. 1, a vibrator according to the present invention includes a rotary member 10, a shaft 20, a pair of bobbins 30 and 40, a coil 100, a housing 90 and a cap 110.

In more detail, the rotary member 10 using a Nd (Neodymium) magnet or a SmCo magnet has a center plate 13 of a disk type and a through hole 14 formed in the center of the center plate 13. The shaft 20 is inserted and fit into the through hole 14 of the center plate 13. Alternatively, in the process of forming the rotary member 10 including the center plate 13, the shaft 20 may be formed in integration with the through hole 14. At this time, the rotary member 10 rotates on the shaft 20.

Figure 2A:
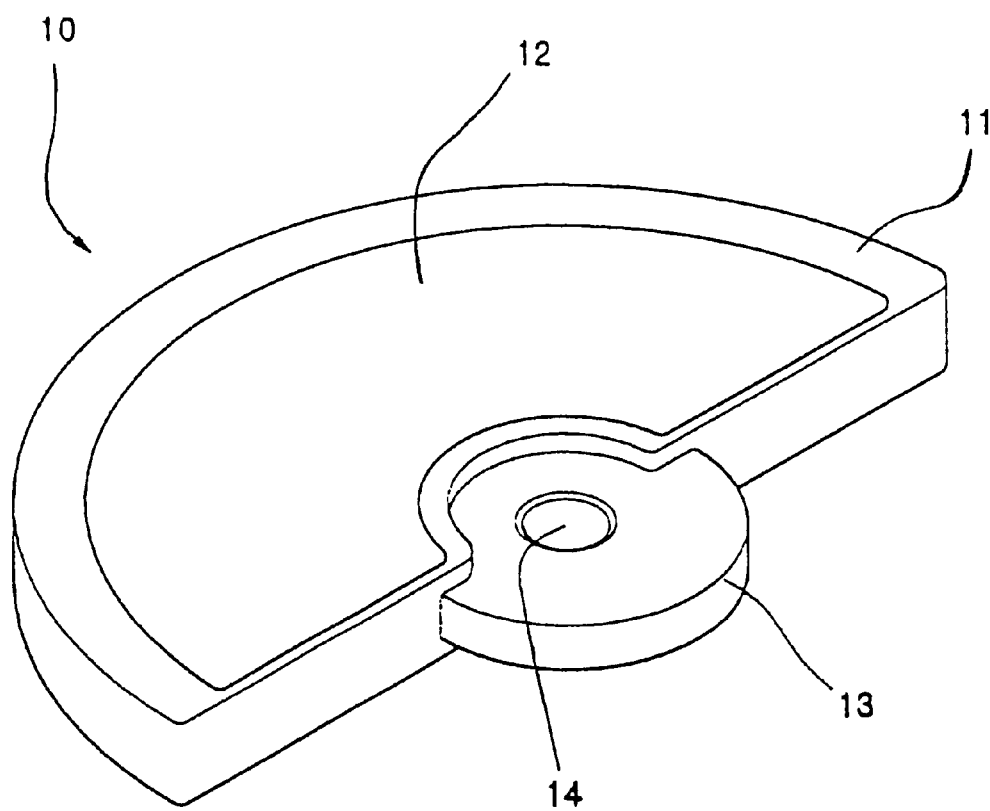
FIG. 2a is a perspective view of a rotary member applied to the vibrator according to a preferred embodiment of the present invention.
Figure 2B:
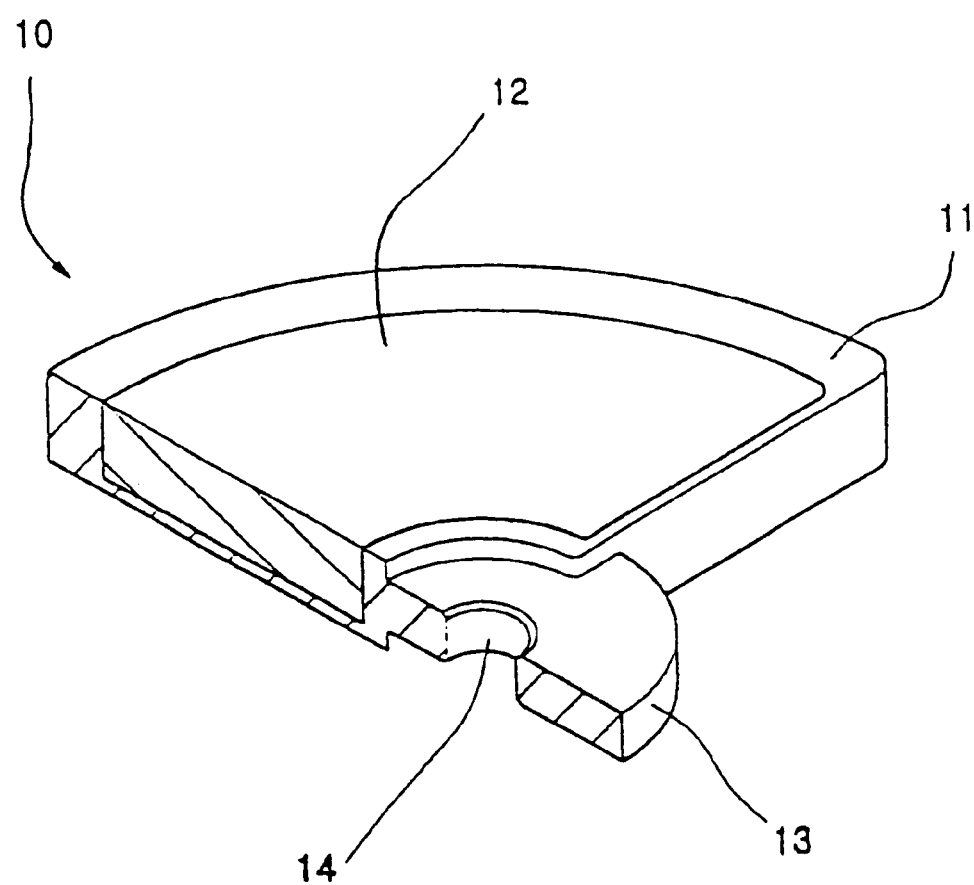
FIG. 2b is a perspective view, partly in section, of the rotary member applied to the vibrator.

As shown in FIG. 2a, a unipolar magnet 11 of an arc shape is eccentrically disposed on the outer surface of the center plate 13. As shown in FIG. 2b, a plastic magnet 12 of a predetermined shape is embedded inside the magnet 11 Alternatively, to maintain the unipolarity of the rotary member 10, the plastic magnet 12 may be formed integrally with the magnet 11.

That is, since the magnet 11 is eccentrically formed on the outer surface of the center plate 13, the vibrator having the rotary member 10 is vibrated when the rotary member 10 rotates on the shaft 20.

FIGS. 3a through 3d show various embodiments of the shaft 20 being the center axis of the rotary member 10. The shaft 20, which is a cylindrical shape in a prescribed length, may be formed integrally with the rotary member 10.

Figure 3A:
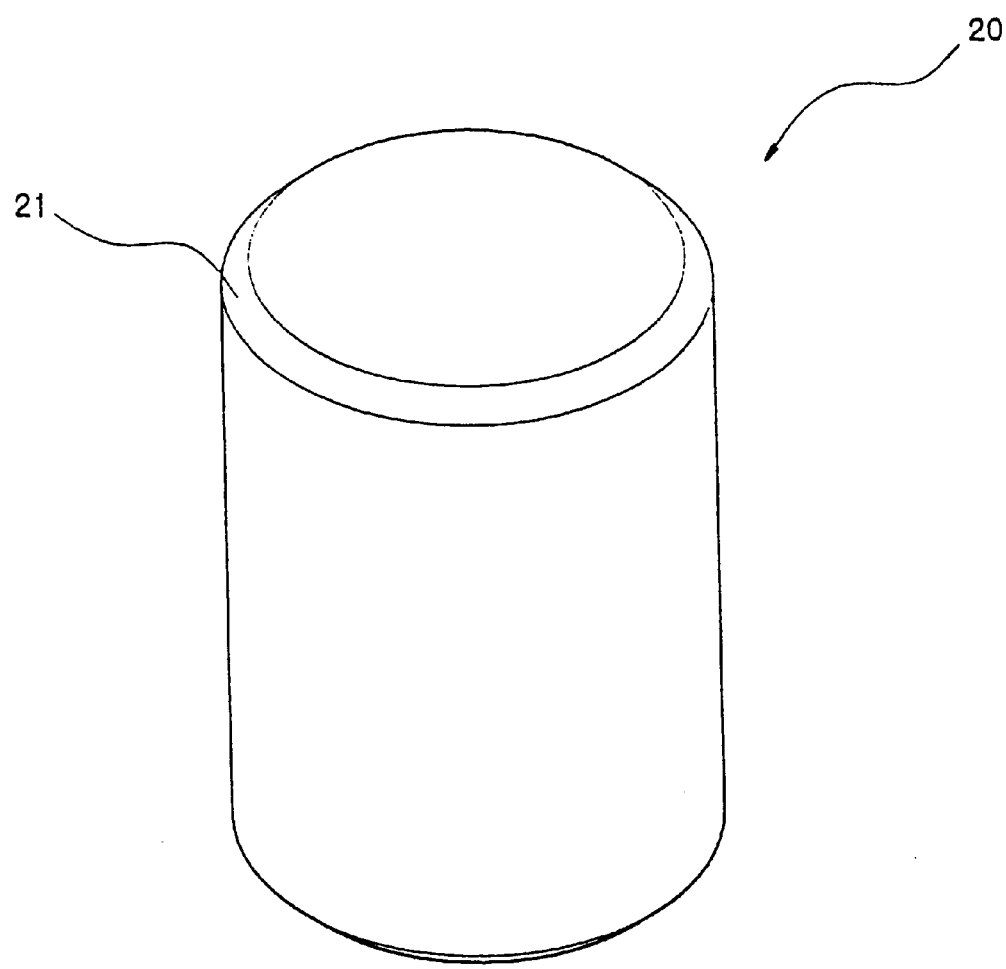
FIGS. 3a to 3d are perspective views of various embodiments of a shaft applied to the vibrator.

FIG. 3a is a perspective view showing a first embodiment of the shaft 20. The shaft 20 has tapered portions 21 at the opposite ends thereof at a prescribed angle. The tapered portions 21 of the shaft 20 reduce the friction between the shaft 20 and a support hole of the bobbin as well as make the process of forming the support hole to be simplified, thereby easily inserting the shaft 20 into the support hole.

Figure 3B:
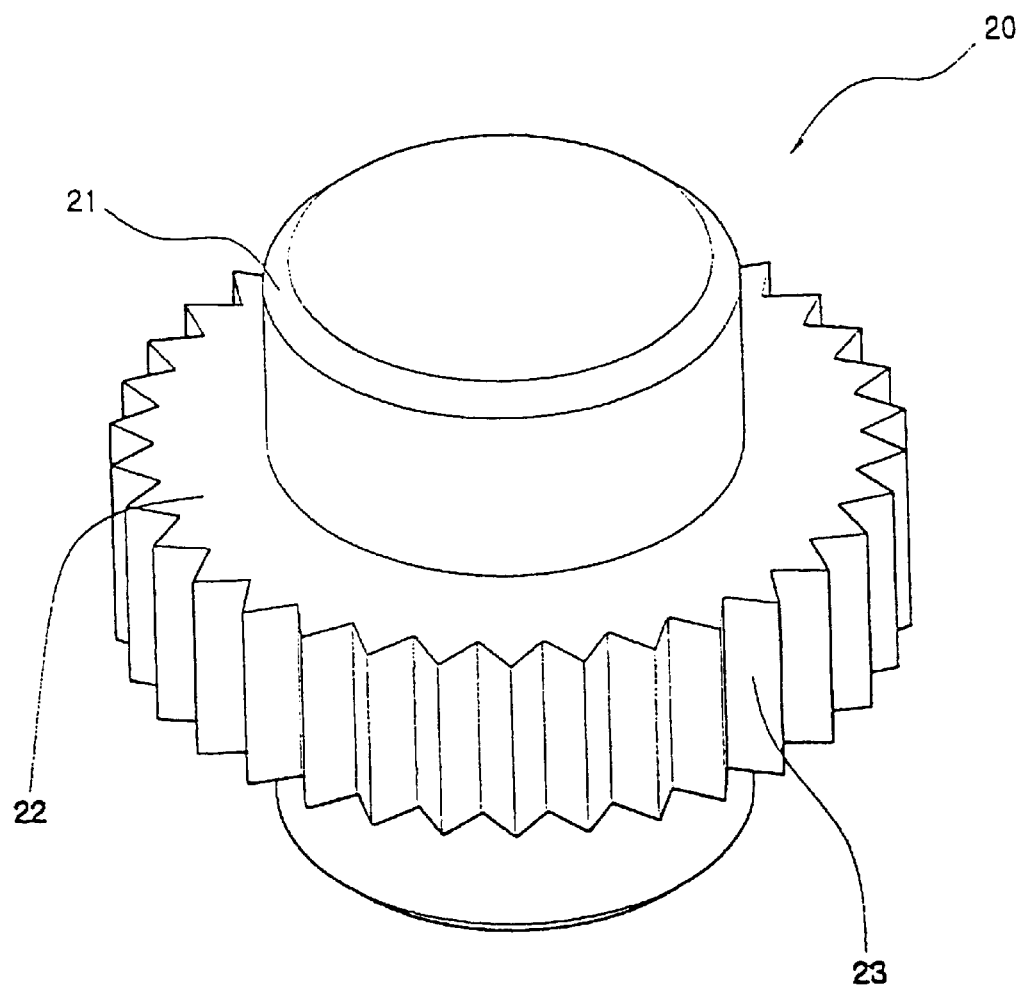

FIG. 3b is a perspective view showing a second embodiment of the shaft 20. The shaft 20 has tapered portions 21 at the opposite ends thereof at a prescribed angle. The tapered portions 21 of the shaft 20 reduce the friction between the shaft 20 and the support hole of the bobbin as well as make the process of forming the support hole to be simplified, thereby easily inserting the shaft 20 into the support hole.

Furthermore, a projection 22 is formed on a portion of the outer surface where the inner surface of the through hole 14 of the center plate 13 meets with it. The diameter of the projection 22 is larger than that of the shaft 20. The projection 22 has a gear portion 23 on the side surface, thereby increasing a binding power between the rotary member 10 and the shaft 20 when the shaft 20 is inserted into the hole 14 of the center plate 13 or formed integrally with the rotary member 10.

The shaft 20 having the projection 22 is made of a metallic material stronger than a material of the rotary member 10. When the rotary member rotates, the bobbins 30 and 40 do not touch the rotary member 10 but touch the shaft 20 of the metallic material, thereby resulting in reducing abrasion of the rotary member 10 and lowering heat produced by the friction.

Figure 3C:
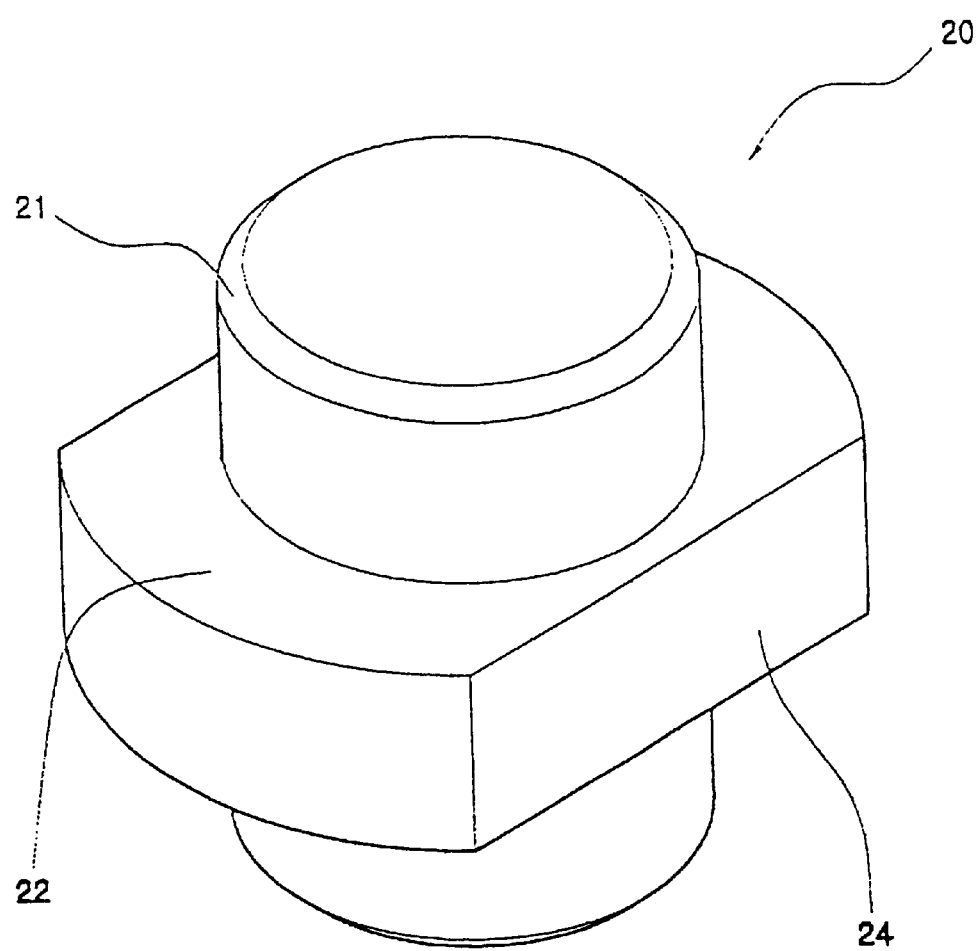

FIG. 3c is a perspective view of a third embodiment of the shaft 20. In this embodiment, the shaft 20 has the tapered portions 21 and the projection 22 like the previous embodiments, to obtain the same effects. Furthermore, the projection 22 has at least one or more plane surfaces 24 formed by completely cutting one or more portions of the outer circumference of the projection 22, thereby preventing the shaft 20 from being separated from the rotary member 10 when the shaft 20 rotates.

The shaft 20 is made of the same metallic material as the previous embodiments. When the rotary member 10 rotates, the bobbins 30 and 40 do not touch the rotary member 10 but touch the shaft 20 of the metallic material, thereby resulting in reducing abrasion of the rotary member 10 and decreasing the friction to the bobbin to lower heat produced during rotation.

Figure 3D:
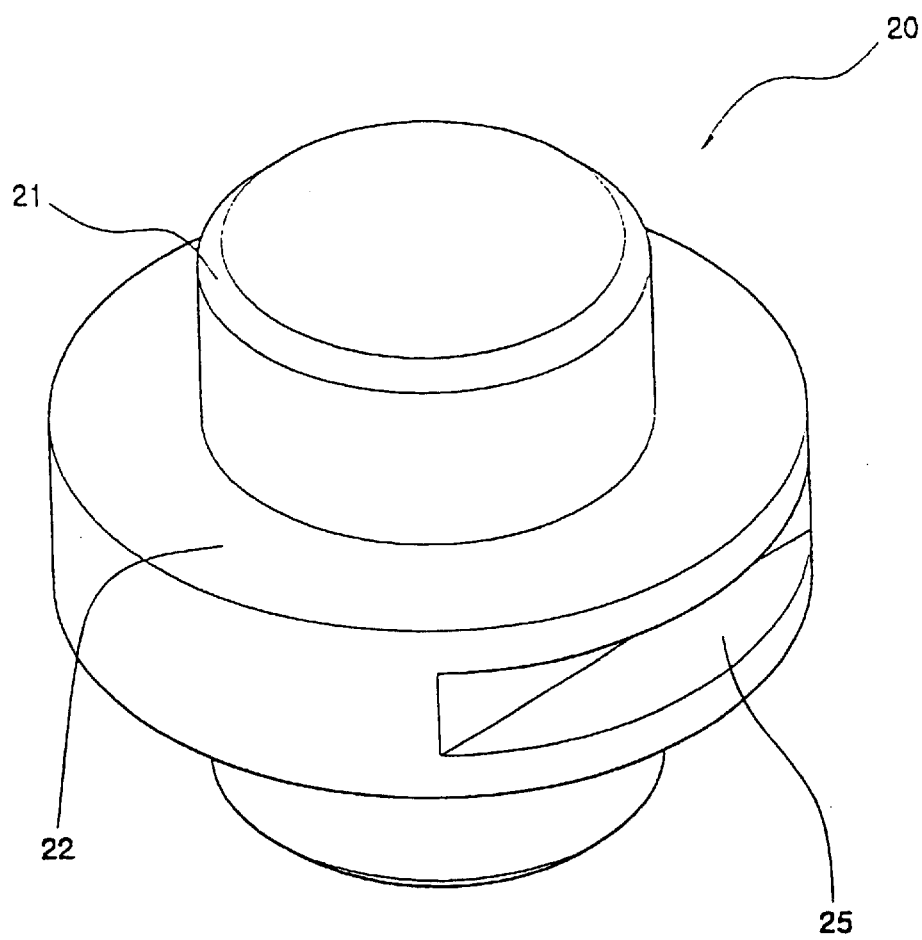
Figure 4A:
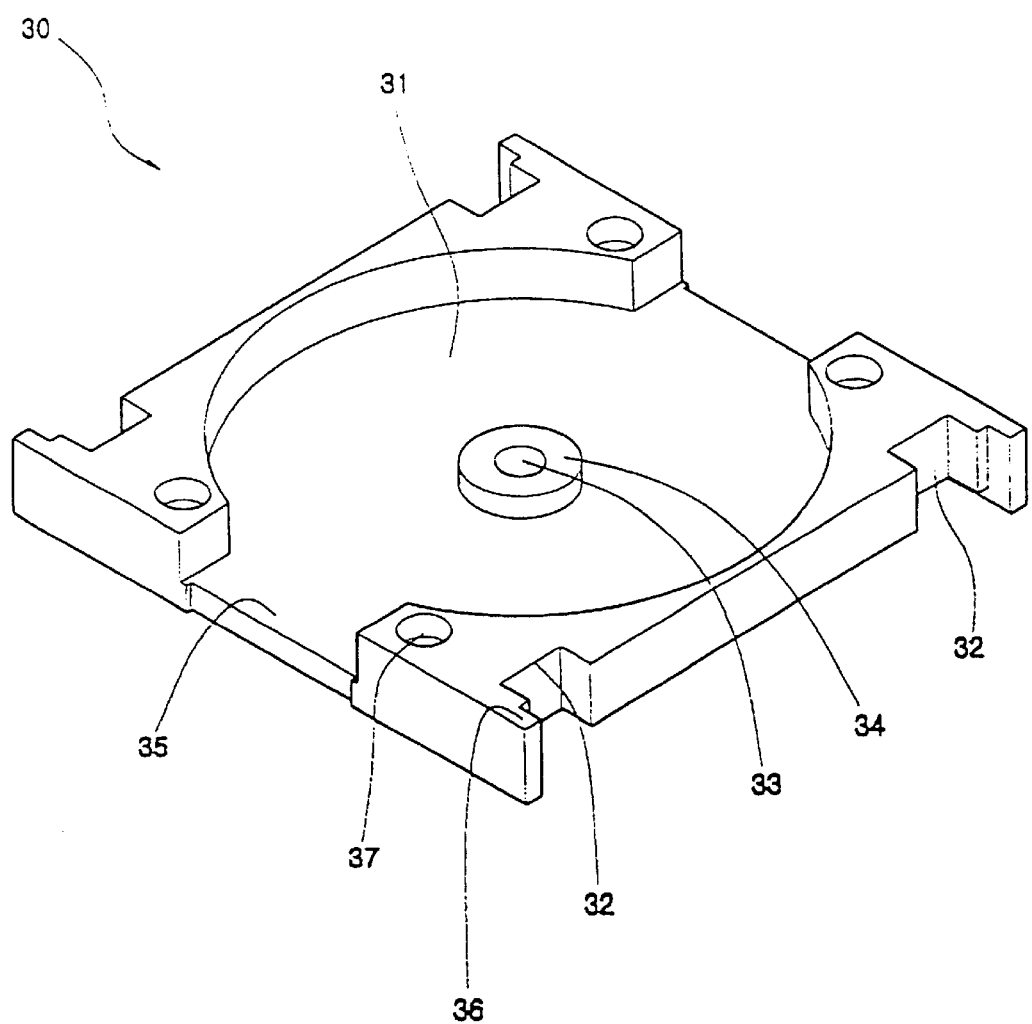
FIG. 4a is a perspective view of an upper bobbin of a pair of bobbins applied to the vibrator according to an embodiment of the bobbins.
Figure 4B:
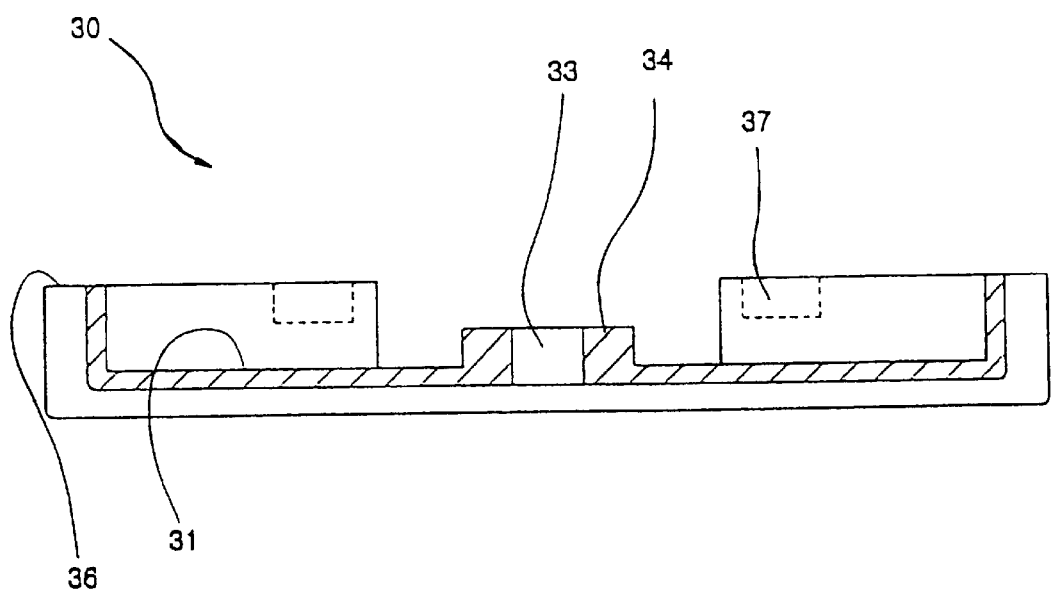
Figure 4C:
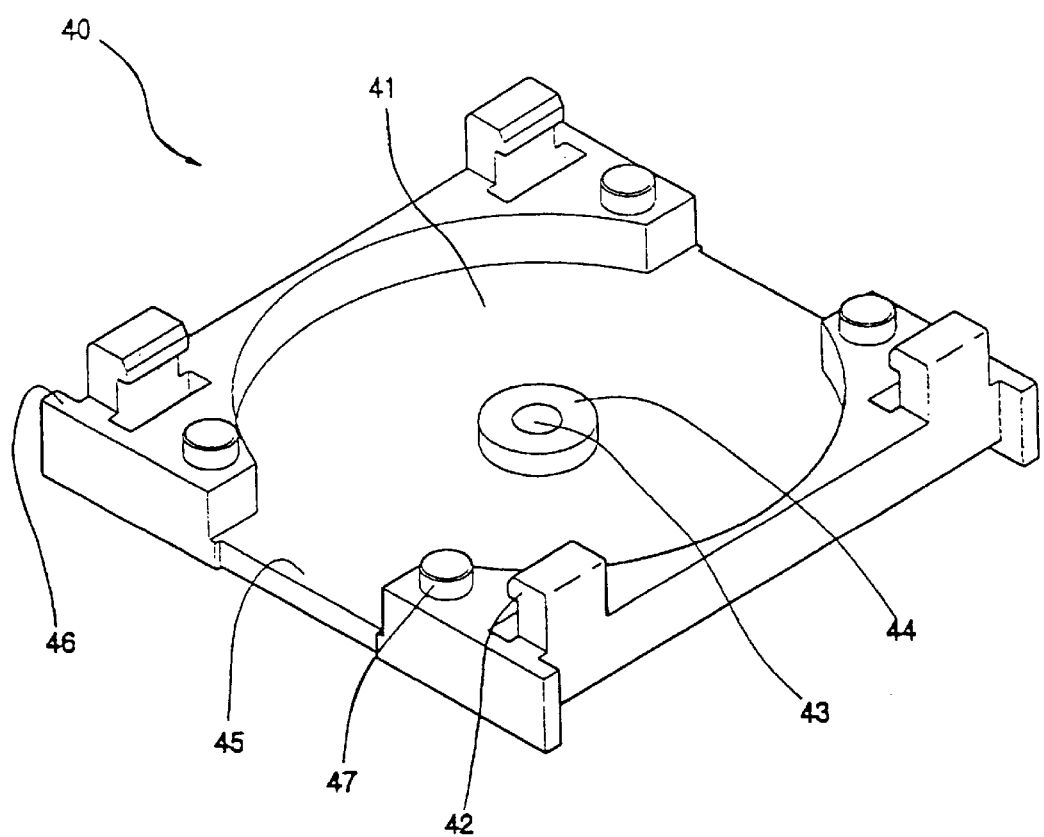
FIG. 4c is a perspective view of a lower bobbin of the bobbin.
Figure 4D:
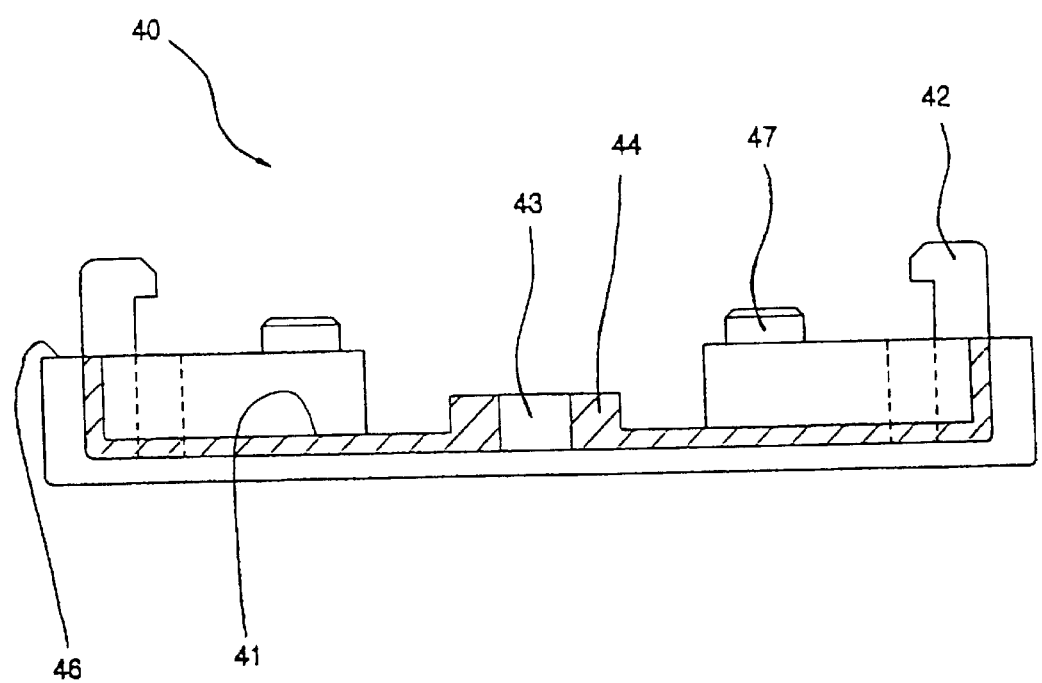
FIG. 4d is a sectional view of FIG. 4c.
Figure 4E:
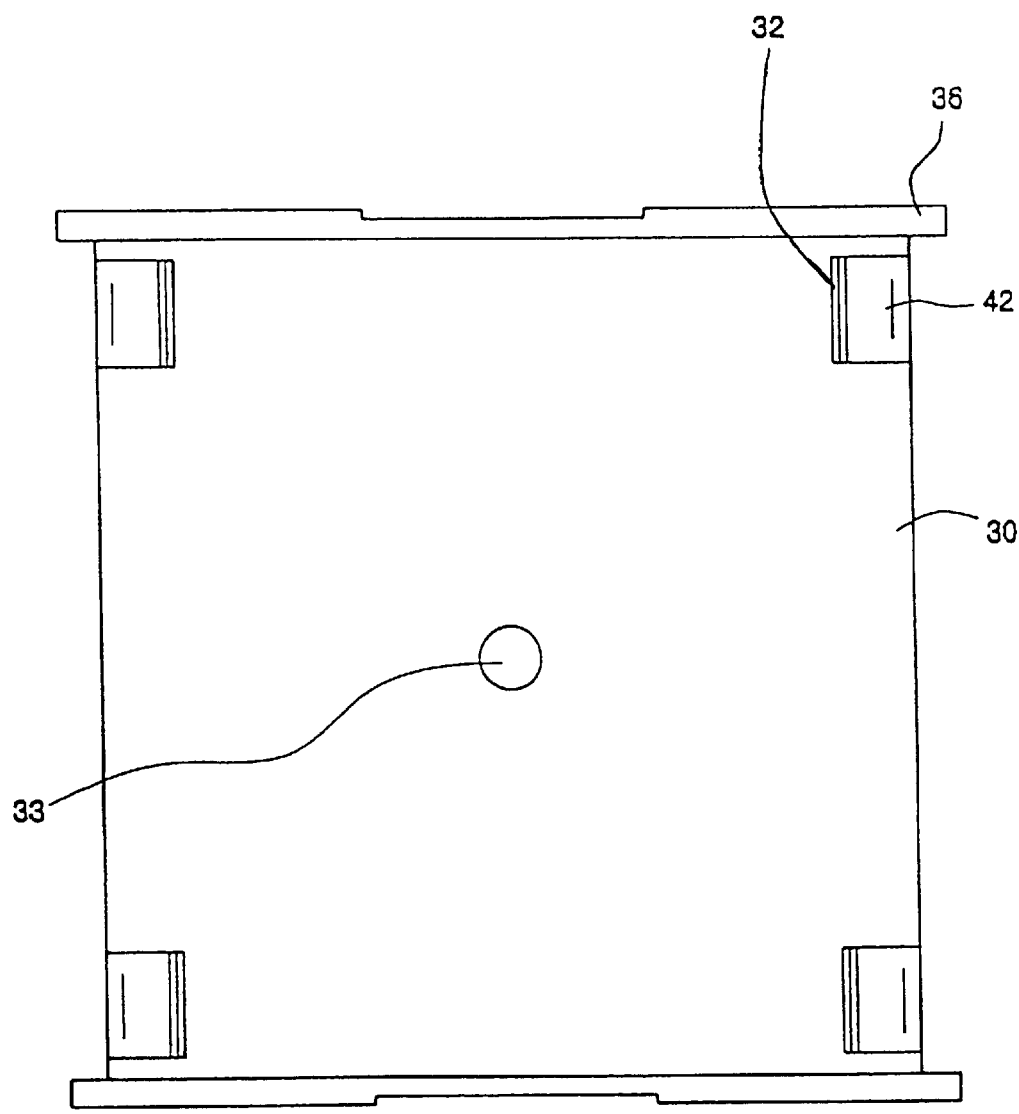
FIG. 4e is a plan view showing an assembled state of the upper bobbin of FIG. 4a and the lower bobbin of FIG. 4c.
Figure 4F:
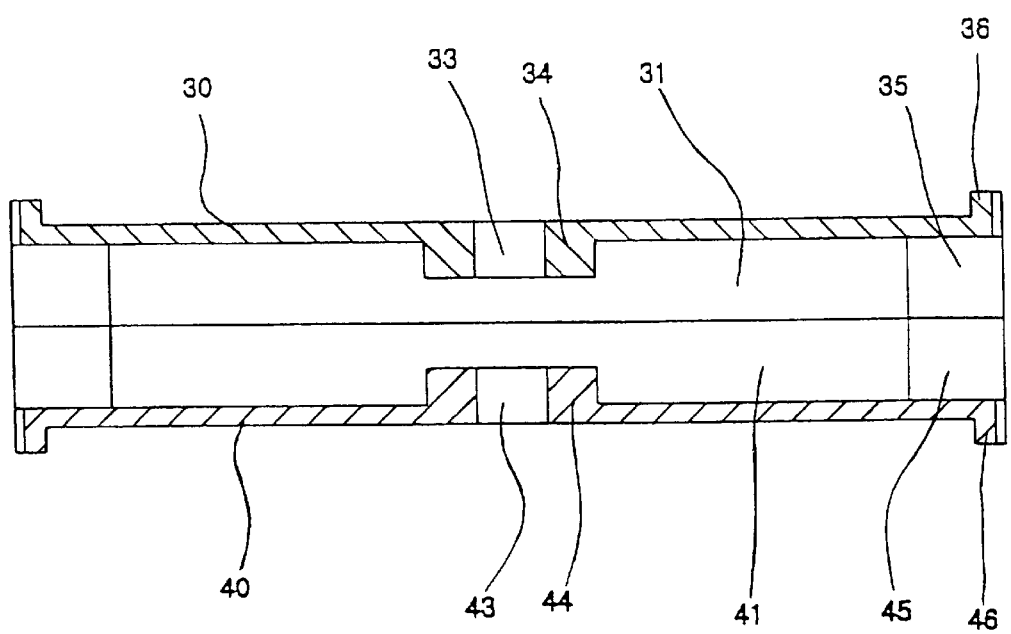
FIG. 4f is a longitudinal sectional view of FIG. 4e.
Figure 4G:
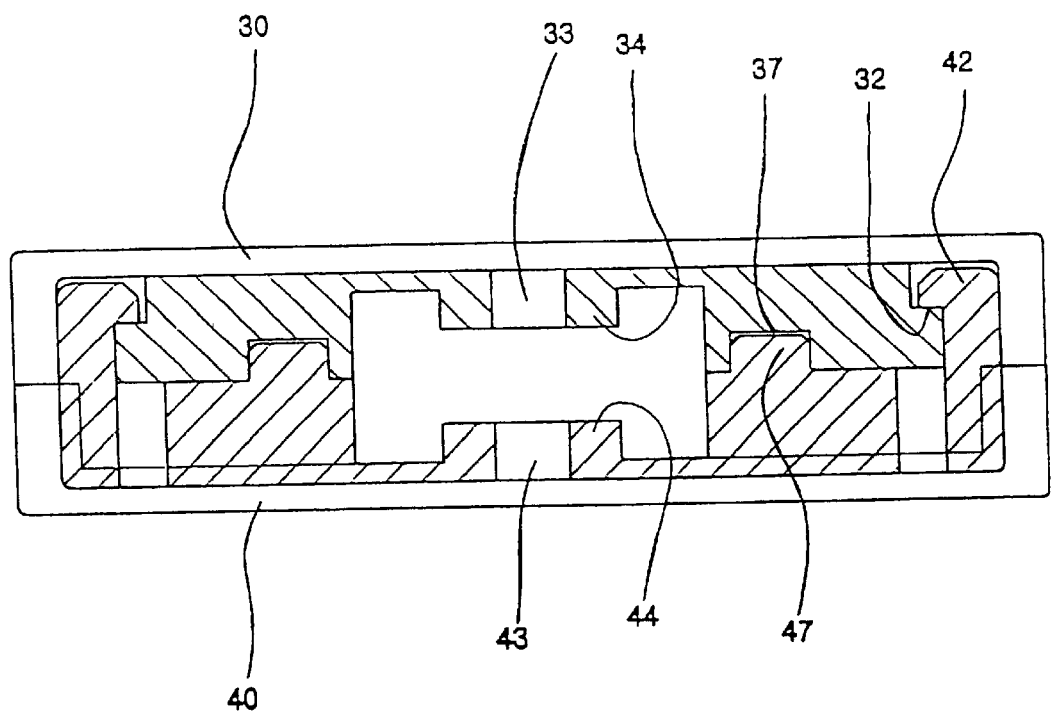
FIG. 4g is a horizontal sectional view of FIG. 4e.
Figure 5A:
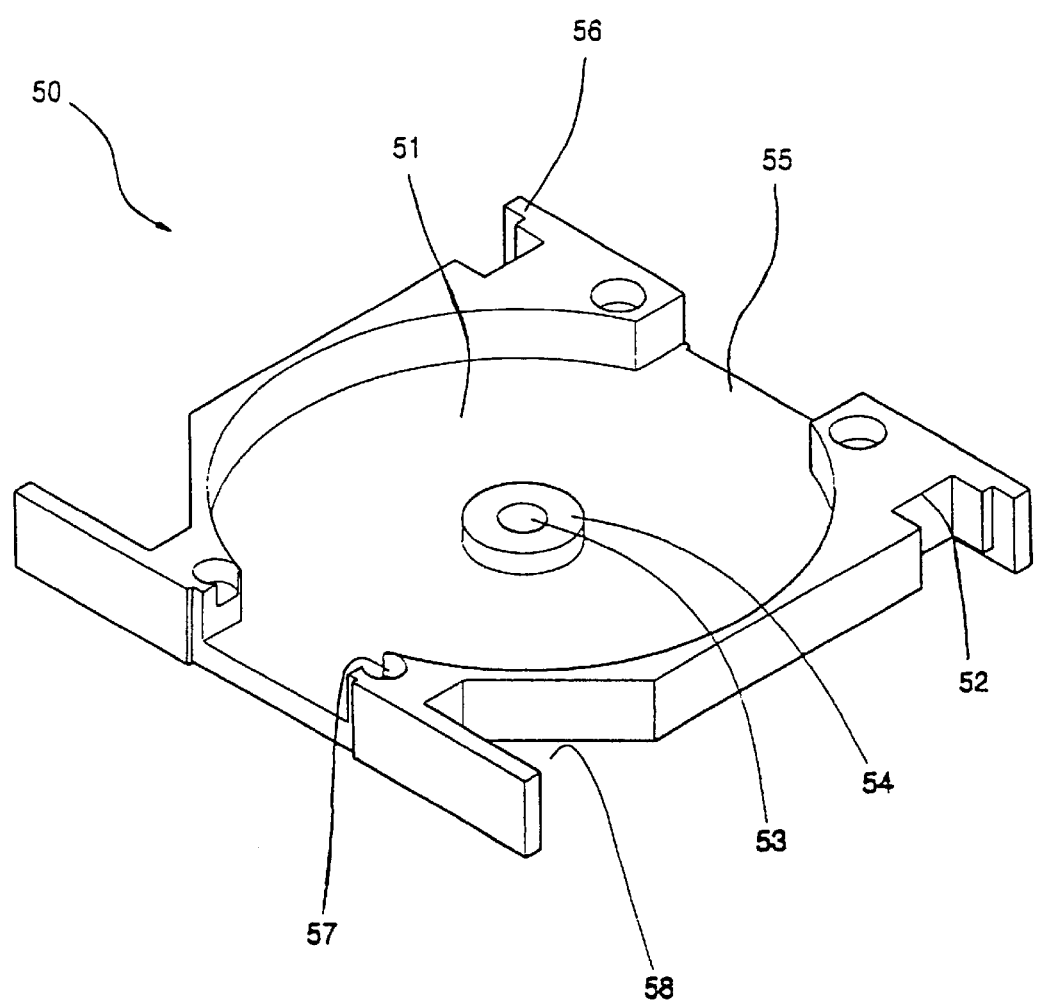
FIG. 5a is a perspective view of an upper bobbin of a pair of bobbins applied to the vibrator according to a second embodiment of the bobbins.
Figure 5B:
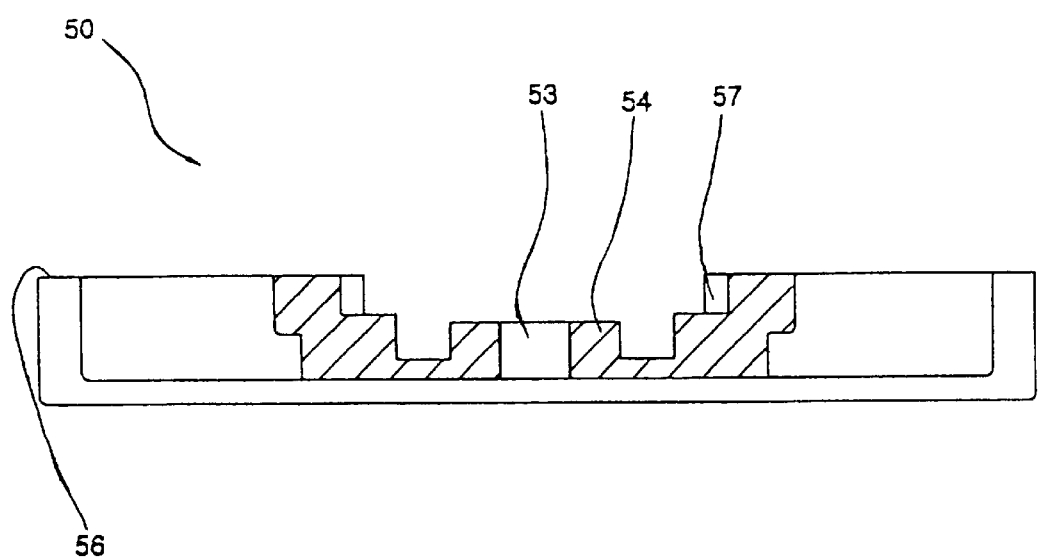
Figure 5C:
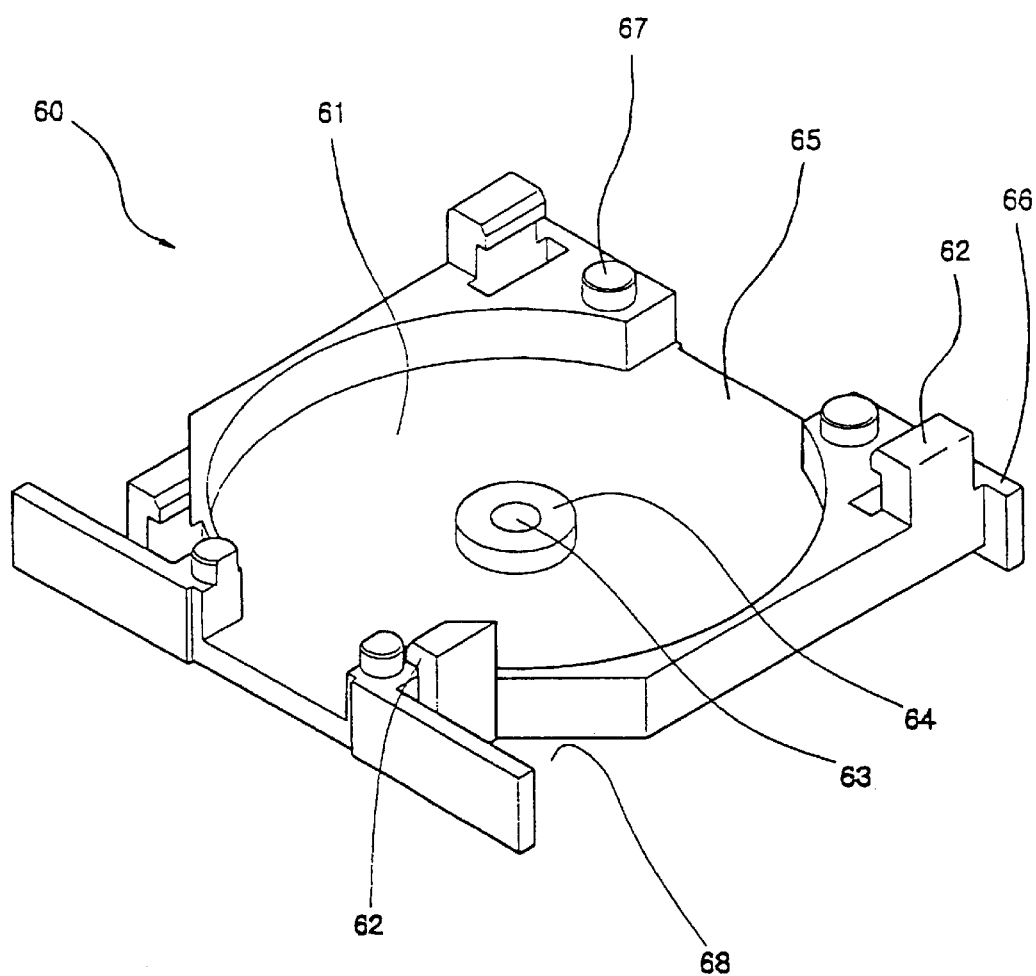
FIG. 5c is a perspective view of a lower bobbin of the bobbin.
Figure 5D:
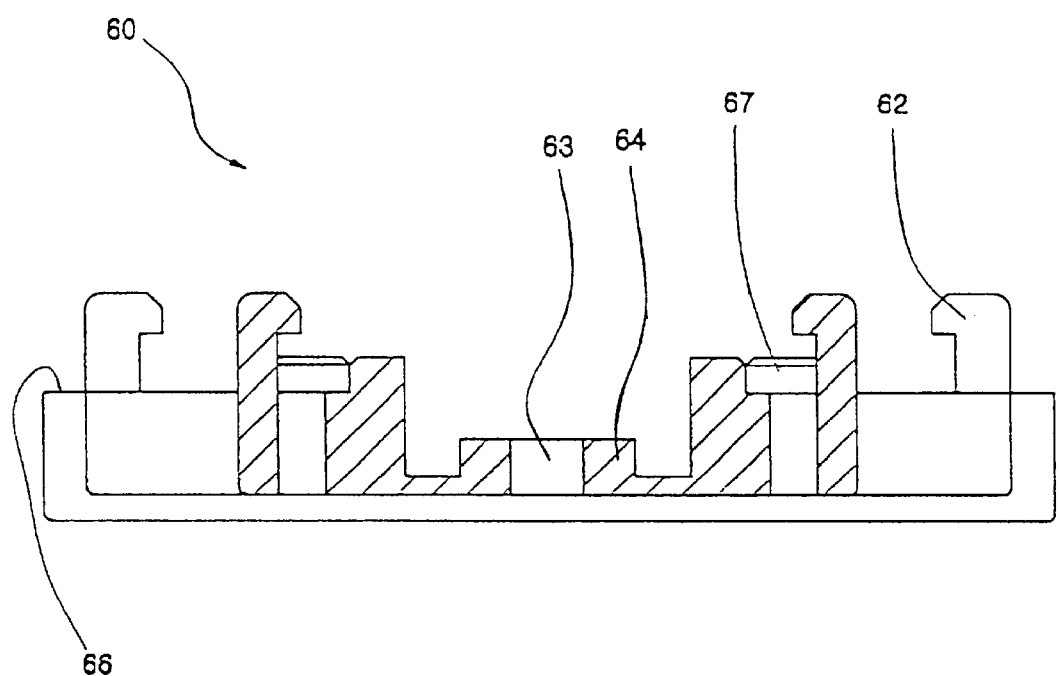
FIG. 5d is a sectional view of FIG. 5c.
Figure 5E:
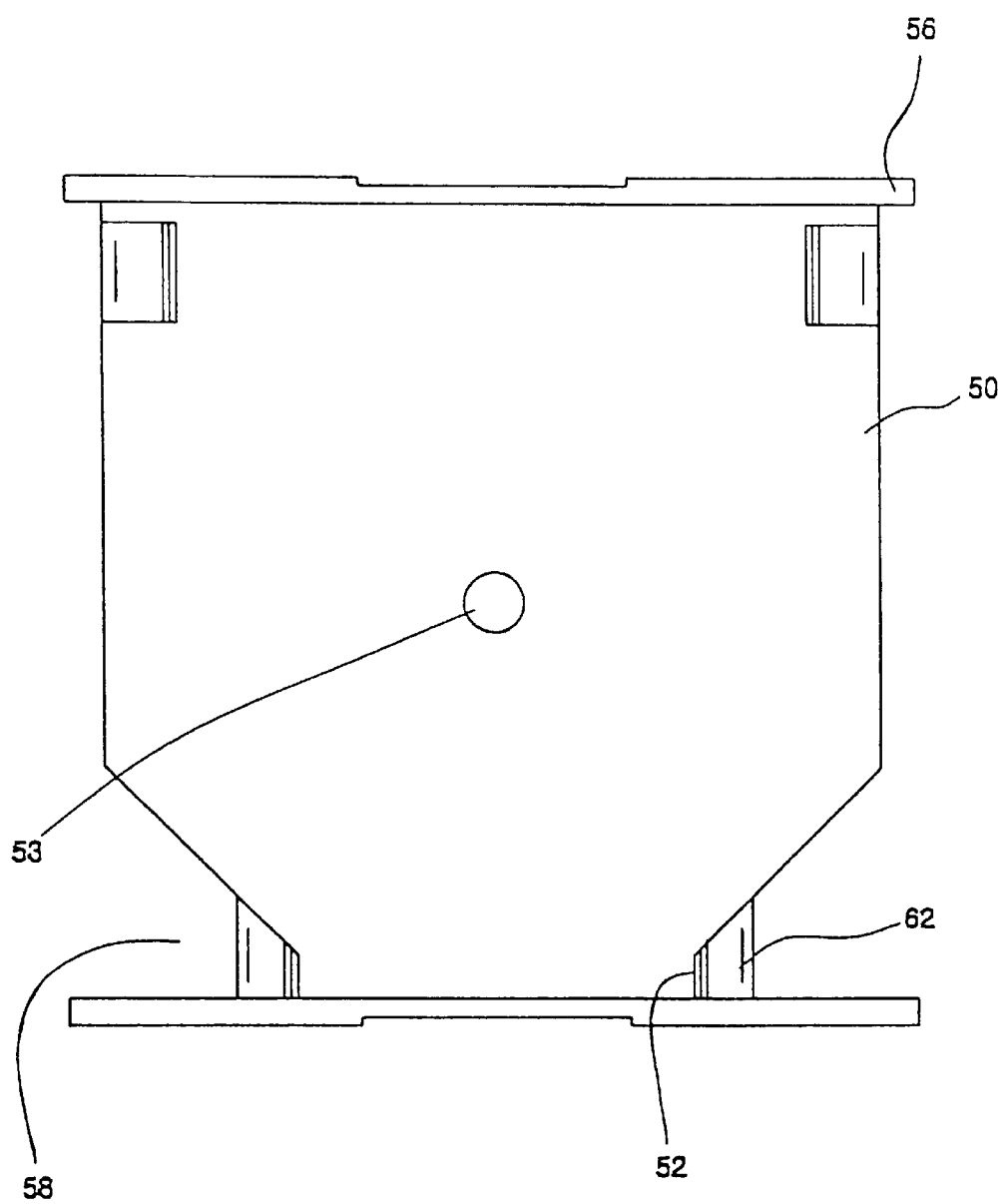
FIG. 5e is a plan view showing an assembled state of the upper bobbin of FIG. 5a and the lower bobbin of FIG. 5c.
Figure 5F:
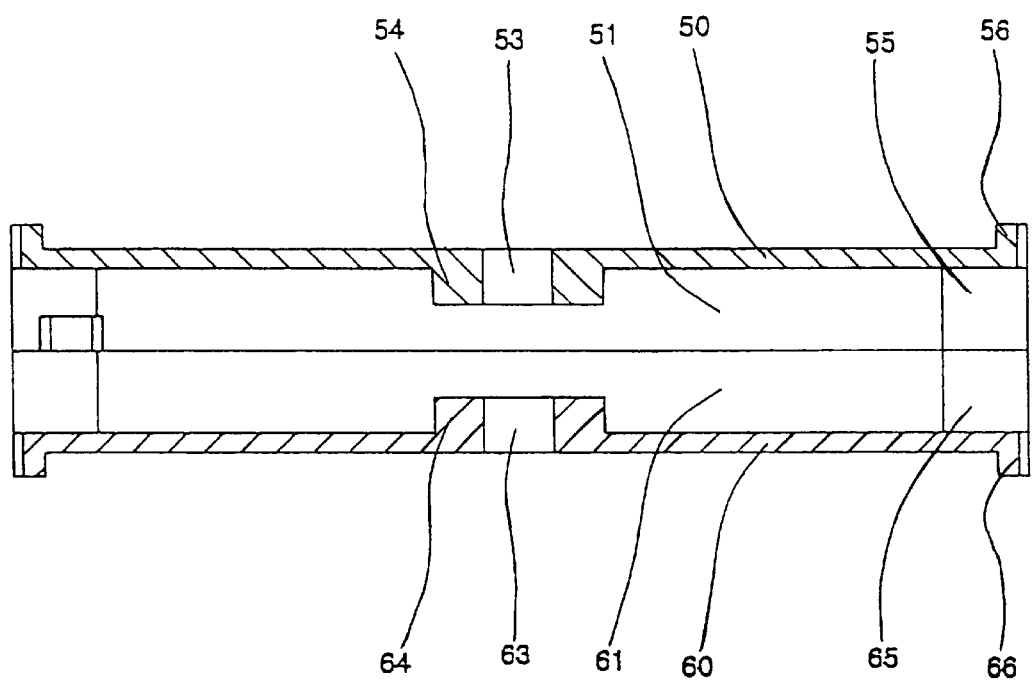
FIG. 5f is a longitudinal sectional view of FIG. 5e.
Figure 5G:
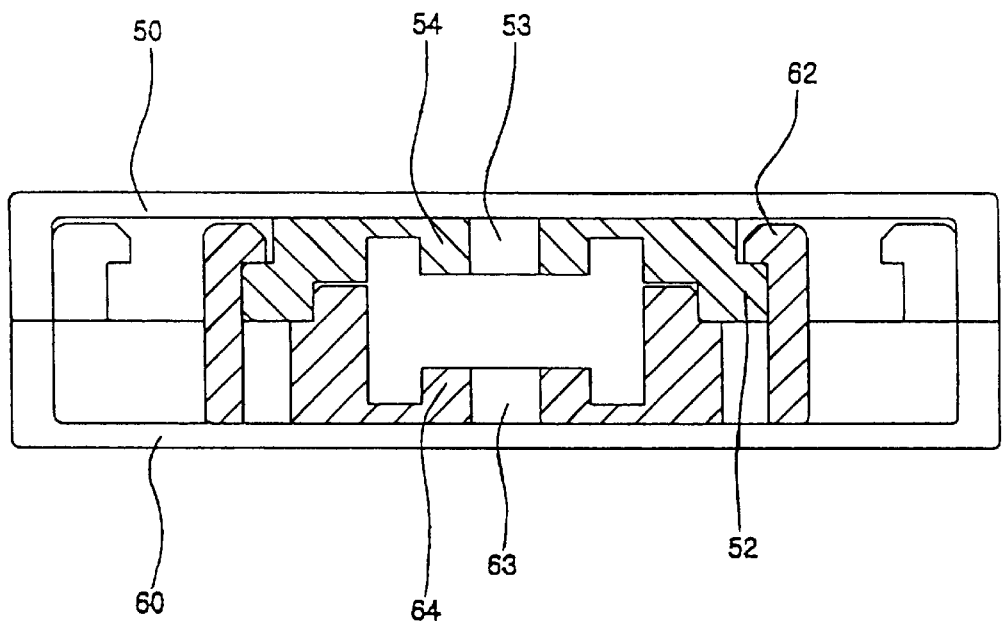
FIG. 5g is a horizontal sectional view of FIG. 5e.
Figure 6A:
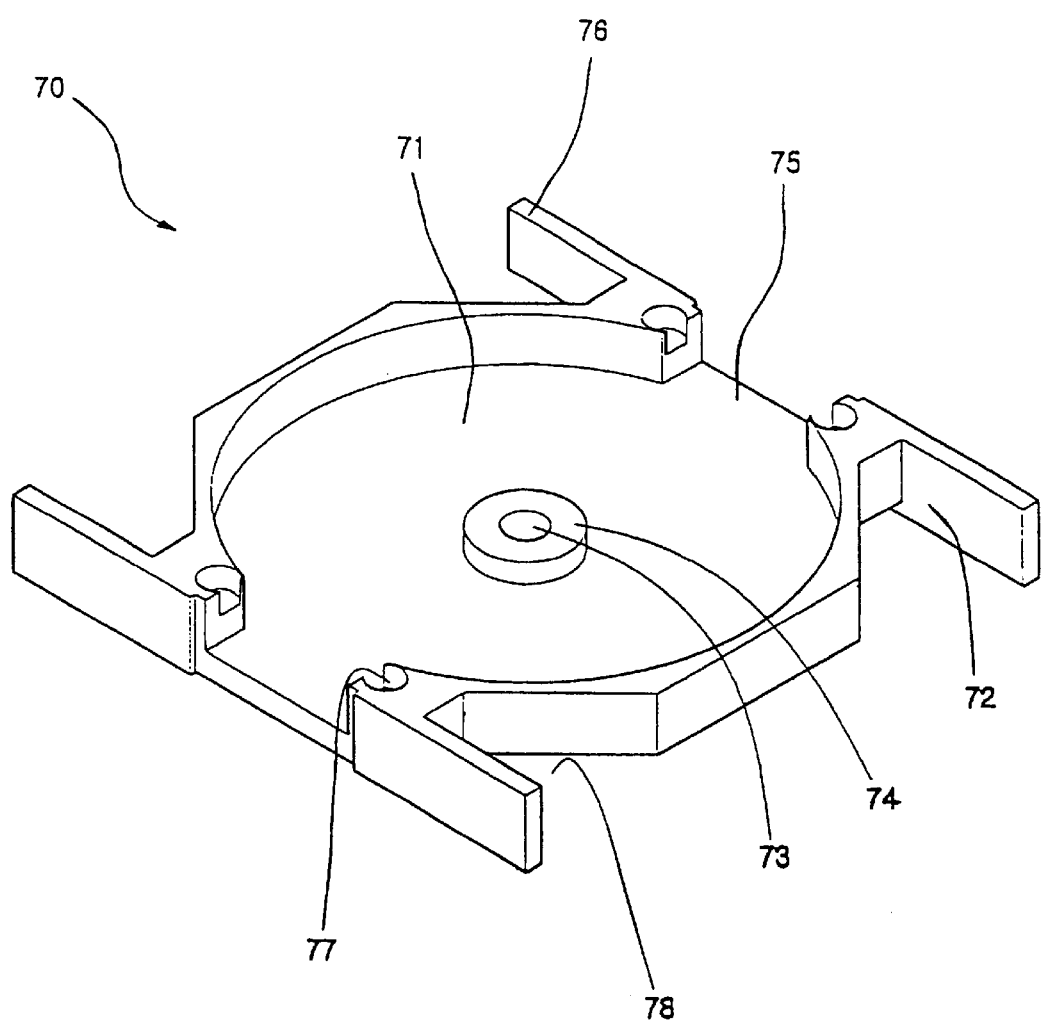
FIG. 6a is a perspective view of an upper bobbin of a pair of bobbins applied to the vibrator according to a third embodiment of the bobbins.
Figure 6B:
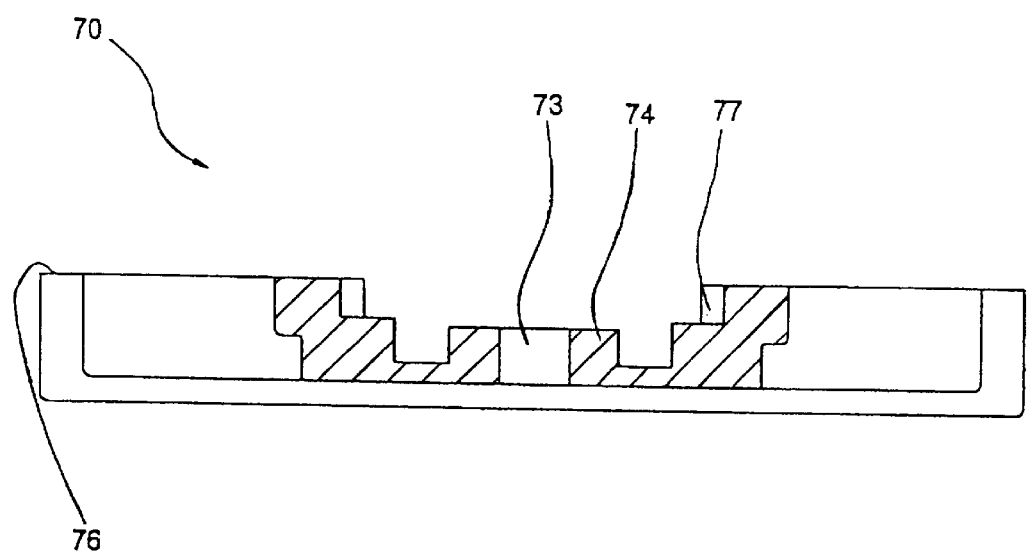
Figure 6C:
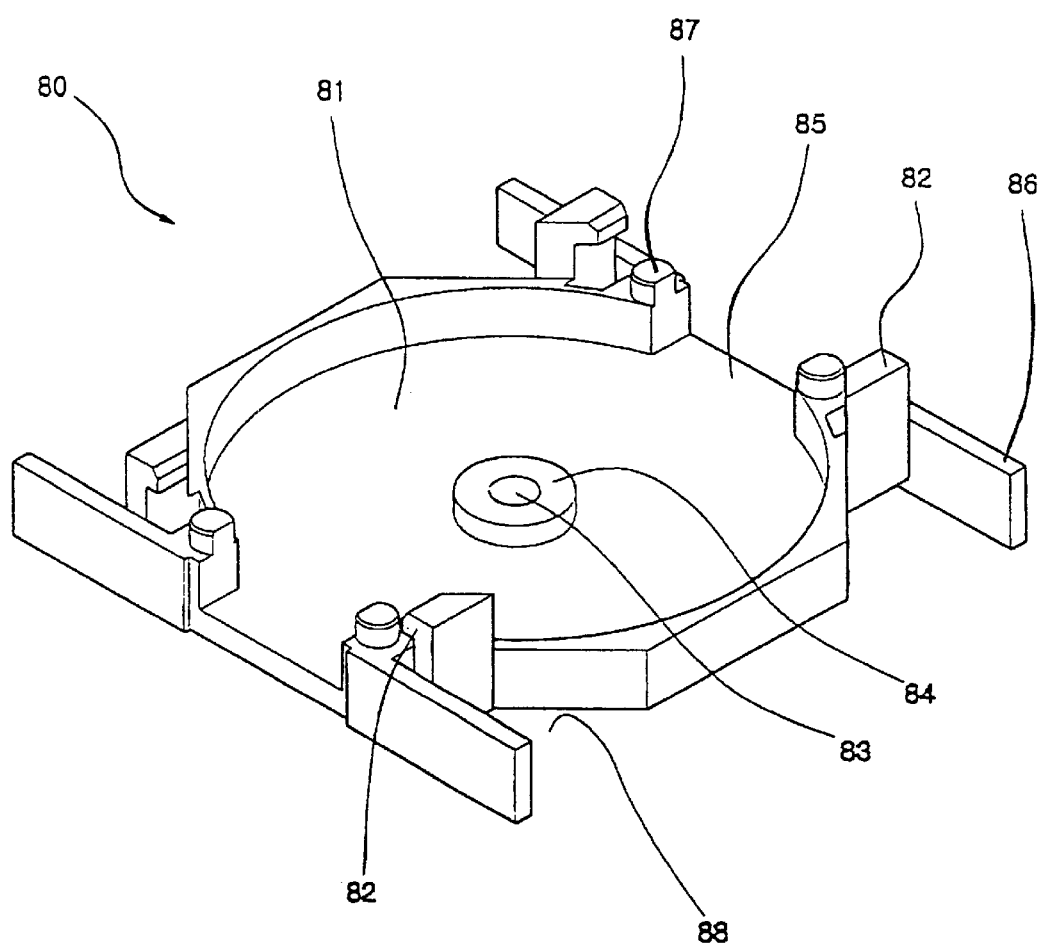
FIG. 6c is a perspective view of a lower bobbin of the bobbins.
Figure 6D:
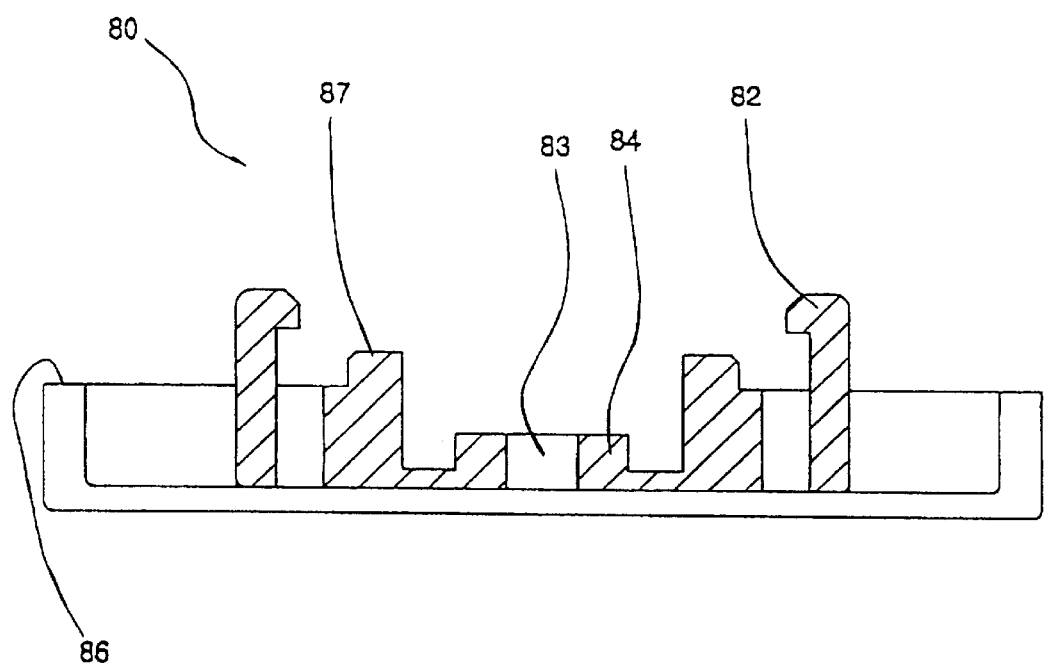
FIG. 6d is a sectional view of FIG. 6c.
Figure 6E:
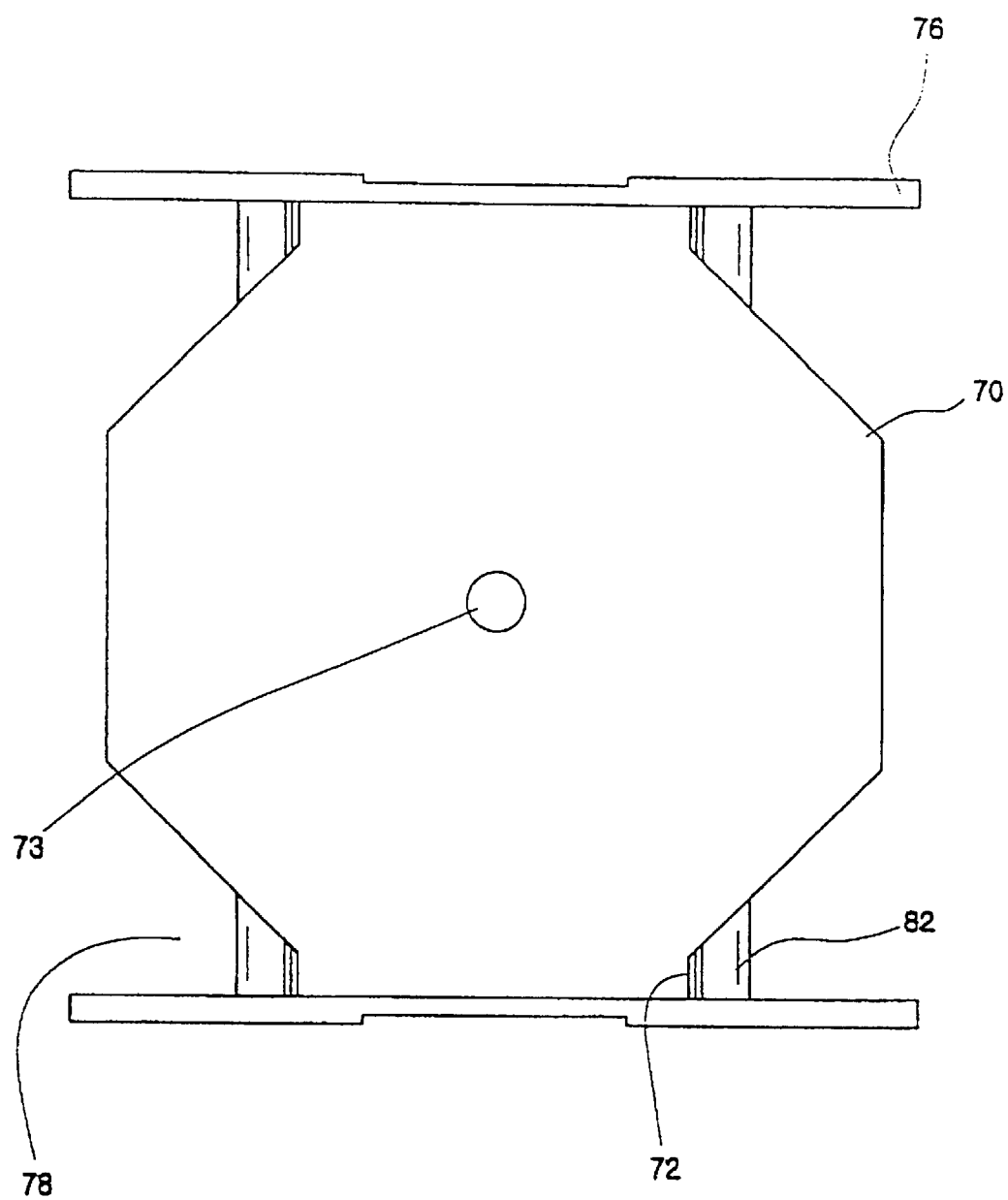
FIG. 6e is a plan view showing as assembled state of the upper bobbin of FIG. 6a and the lower bobbin of FIG. 6c.
Figure 6F:
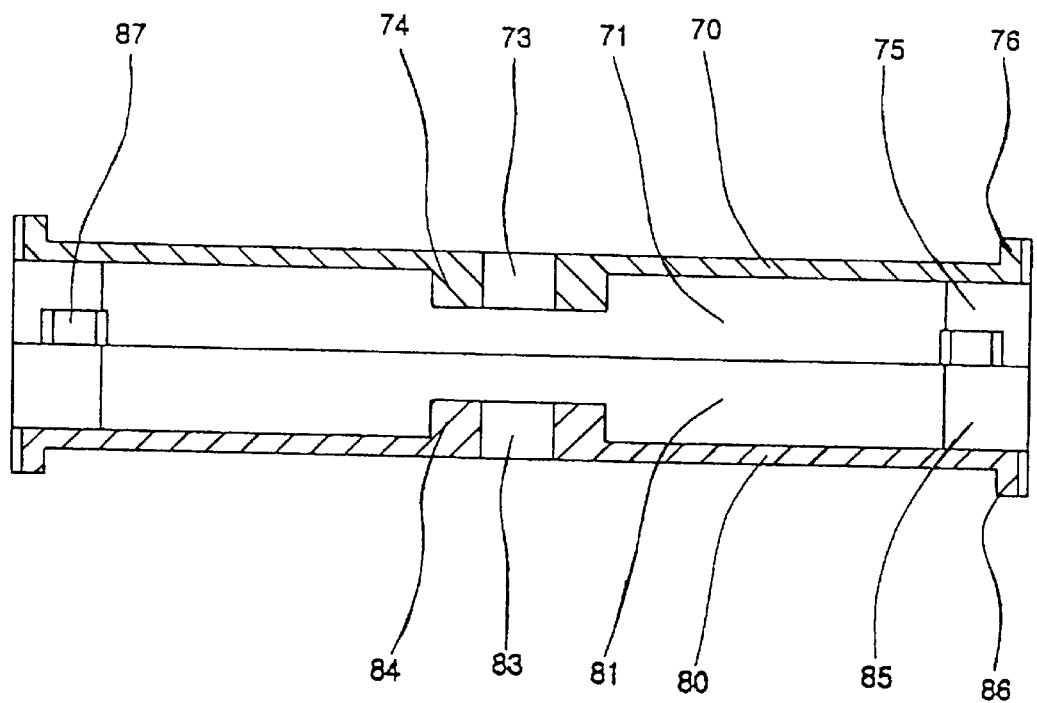
FIG. 6f is a longitudinal view of FIG. 6e.
Figure 6G:
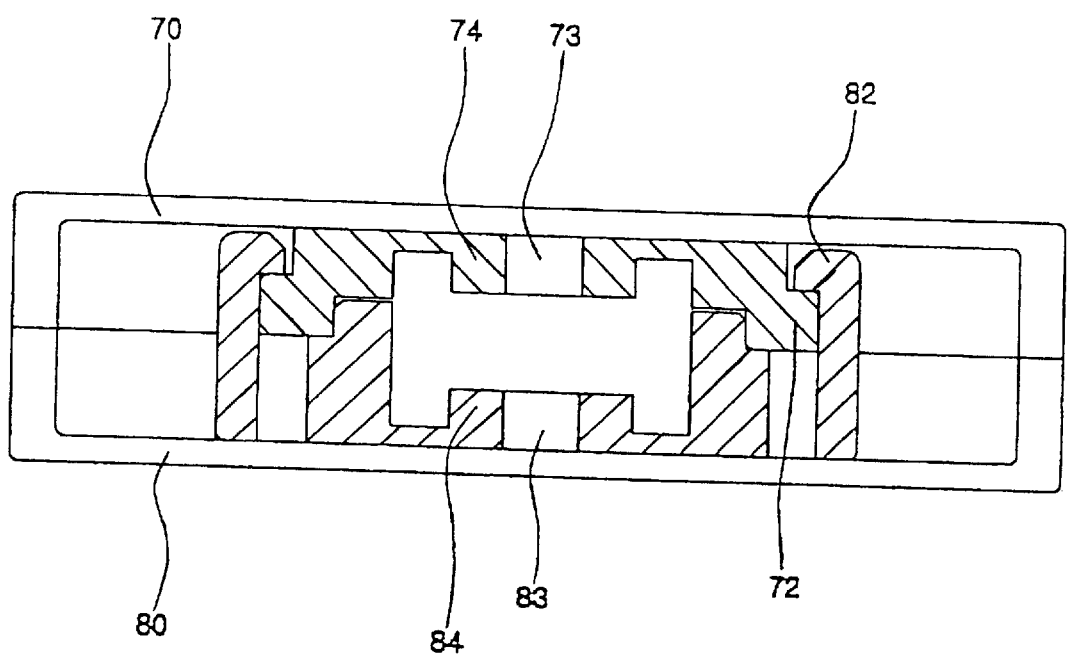
FIG. 6g is a horizontal view of FIG. 6e.

FIG. 3d is a perspective view of a fourth embodiment of the shaft 20. In this embodiment, the shaft 20 has the tapered portions 21 and the projection 22 like the previous embodiments, to obtain the same effects. Furthermore, the projection 22 has at least one or more plane surfaces 25 formed by partially cutting one or more portions of the outer circumference of the projection 22, thereby preventing the shaft 20 from being separated from the rotary member 10 when the shaft 20 rotates and preventing the shaft 20 from slipping upward or downward out of the hole 14 of the rotary member 10.

The shaft 20 is made of the same metallic material as the previous embodiments. When the rotary member 10 rotates, the bobbins do not touch the rotary member 10 but touch the shaft 20 of the metallic material, thereby resulting in reducing abrasion of the rotary member 10 and decreasing the friction to the bobbin to lower heat produced during rotation.

As described above, the rotary member 10 is arranged inside the connected upper and lower bobbins 30 and 40, i.e., a pair of bobbins, and rotated on the shaft 20. The connected bobbins have a confined space for allowing the rotary member 10 to rotate and a coil 100 wound on the outer surface of the bobbins 30 and 40.

The coil 100 wound on the outer surface of the bobbins 30 and 40 is excited with a driving power supply input from the outside, thereby causing a generation of magnetic force for rotating the rotary member 10 arranged inside the bobbins 30 and 40. That is, the magnetic force of the rotary member 10, which is a permanent magnet, and the magnetic force produced by the current of the coil 100 generate repulsive power against each other, so that the rotary member 10 is rotated on the shaft 20.

FIGS. 4a through 4g show a first embodiment of a pair bobbins including the upper and the lower bobbins 30 and 40 which are detachably connected to each other.

The upper and the lower bobbins 30 and 40 respectively have a round confined spaces 31 and 41 for allowing the rotary member 10 to rotate. The round confined spaces 31 and 41 are formed in such a manner that the center portion becomes lower than the peripheral surface thereof.

Each bobbin has a support hole 33 and 43 at the center portion for supporting the rotary member 10 and a boss 34 and 44 protruded from the inner surface thereof. The boss is formed around the support hole 33 and 43. When rotating on the shaft 10, the rotary member 10 does not touch the surfaces of the upper and lower bobbins 30 and 40 but touch only the bosses 34 and 44, thereby resulting in reducing a resistance occurred by the friction between the rotary member 10 and the bobbins 30 and 40.

Each bobbin has a pair of air holes 35 and 45 on the opposite sides, and the air holes 35 and 45 communicate with the confined spaces 31 and 41 and the outside, thereby causing the air to flow smoothly during the rotation of the rotary member 10. That is, when the rotary member 10 is rotated, the friction between the rotary member 10 and the air can be reduced.

The upper and lower bobbins 30 and 40 are connected integrally with each other by a connecting or coupling device, namely, fixed jaws 32 and hooks 42. The fixed jaws 32 are formed at each edge of the upper bobbin 30. The hooks 42 are formed at each edge of the lower bobbin 40 for engaging the fixed jaws 32. Therefore, the bobbins 30 and 40 are easily connected with each other and detached from each other, and the rotary member 10 is conveniently inserted into the connected bobbins.

A number of holes 37 are formed inwardly from the fixed jaws 32 of the upper bobbin 30 and a number of bosses 47 are formed inwardly from the hooks 42 of the lower bobbin 40 at the corresponding locations of the holes 37 of the upper bobbin 30, so that the upper and lower bobbins 30 and 40 are accurately connected with each other.

The coil 100 generating the magnetic force is wound on the outer surface of the integrally connected bobbins 30 and 40. The upper and lower bobbins 30 and 40 respectively have screen walls 36 and 46 formed at the opposite side ends for preventing the wound coil 100 from slipping out of the bobbins 30 and 40.

Furthermore, the screen walls 36 and 46 prevent that the coil 100 is broken down due to touch of the cap 110 with the coil 100 when the bobbins 30 and 40 on which the coil 100 is wound are fit into the cap 110 or that the covering of the coil 100 comes off.

A magnetic member 39 is disposed in a prescribed location of the outer wall of the upper bobbin 30 or the lower bobbin 40, thereby causing the rotary member 10 to be stopped at a fixed location. In other words, the rotary member 10 being rotated by the external power supply is stopped at the fixed location when the power supply is stopped. In initial rotation, the repulsive power between the magnetic force of the rotary member 10 and that of the coil 100 can be maximized to lead the rotation of the rotary member 10.

FIGS. 5a through 5g show a second embodiment of a pair bobbins including upper and lower bobbins 50 and 60, which are detachably connected to each other.

The upper and the lower bobbins 50 and 60 respectively have a round confined spaces 51 and 61 for allowing the rotary member 10 to rotate. The round confined spaces 51 and 61 are formed in such a manner that the center portion becomes lower than the peripheral surface thereof.

Each bobbin has a support hole 53 and 63 at the center portion for supporting the rotary member 10 and a boss 54 and 64 protruded from the inner surface thereof. The boss is formed around the support hole 53 and 63. When rotating on the shaft 10, the rotary member 10 does not touch the surfaces of the upper and lower bobbins 50 and 60 but touch only the bosses 54 and 64, thereby resulting in reducing a resistance occurred by the friction between the rotary member 10 and the bobbins 50 and 60.

Each bobbin has a pair of air holes 55 and 65 on the opposite sides thereof, and the air holes 55 and 65 communicate with the confined spaces 51 and 61 and the outside, thereby causing the air to flow smoothly during the rotation of the rotary member 10. That is, when the rotary member 10 is rotated, the friction between the rotary member 10 and the air can be reduced.

The upper and lower bobbins 50 and 60 are connected integrally with each other by connecting means, namely, fixed jaws 52 and hooks 62. The fixed jaws 52 are formed at each edge of the upper bobbin 50. The hooks 62 are formed at each edge of the lower bobbin 60 for engaging the fixed jaws 52. Therefore, the bobbins 50 and 60 are easily connected with each other and detached from each other, and the rotary member 10 is conveniently inserted into the connected bobbins.

A number of holes 57 are formed inwardly from the fixed jaws 52 of the upper bobbin 50 and a number of bosses 67 are formed inwardly from the hooks 62 of the lower bobbin 60 at the corresponding locations of the holes 57 of the upper bobbin 50, so that the upper and lower bobbins 50 and 60 are accurately connected with each other.

The coil 100 generating the magnetic force is wound on the outer surface of the integrally connected bobbins 50 and 60. The upper and lower bobbins 50 and 60 respectively have screen walls 56 and 66 formed at the opposite side ends for preventing the wound coil 100 from slipping out of the bobbins 50 and 60.

Furthermore, the screen walls 56 and 66 prevent that the coil 100 is broken down due to touch of the cap 110 with the coil 100 when the bobbins 50 and 60 on which the coil 100 is wound are fit into the cap 110 or that the covering of the coil 100 comes off.

A magnetic member 59 is disposed in a prescribed location of the outer wall of the upper bobbin 50 or the lower bobbin 60, thereby causing the rotary member 10 to be stopped at a fixed location. In other words, the rotary member 10 being rotated by the external power supply is stopped at the fixed location when the power supply is stopped. In initial rotation, the repulsive power between the magnetic force of the rotary member 10 and that of the coil 100 can be maximized to lead the rotation of the rotary member 10.

Additionally, the upper and lower bobbins 50 and 60 respectively have waist portions 58 and 68 formed at opposite sides of one portion thereof to make the number of winding of the coil 100 wound on the outer surface of the bobbins 50 and 60 differ.

That is, the magnetic force differs depending on the number of winding of the coil 100 wound on the outer surface of the bobbins 50 and 60 to increase the repulsive power against the rotary member 10, thereby rotating the rotary member 100 more effectively.

FIGS. 6a through 6g show a third embodiment of a pair bobbins including upper and lower bobbins 70 and 80, that are detachably connected to each other.

The upper and the lower bobbins 70 and 80 respectively have a round confined spaces 71 and 81 for allowing the rotary member 10 to rotate. The round confined spaces 71 and 81 are formed in such a manner that the center portion becomes lower than the peripheral surface thereof.

Each bobbin has a support hole 73 and 83 at the center portion for supporting the rotary member 10 and a boss 74 and 84 protruded from the inner surface thereof. The boss is formed around the support hole 73 and 83. When rotating on the shaft 10, the rotary member 10 does not touch the surfaces of the upper and lower bobbins 70 and 80 but touch only the bosses 74 and 84, thereby reducing a resistance occurred by the friction between the rotary member 10 and the bobbins 70 and 80.

Each of the bobbins 70 and 80 has a pair of air holes 75 and 85 on the opposite sides thereof, and the air holes 75 and 85 communicate with the confined spaces 71 and 81 and the outside, thereby causing the air to flow smoothly during the rotation of the rotary member 10. That is, when the rotary member 10 is rotated, the friction between the rotary member 10 and the air can be reduced.

The upper and lower bobbins 70 and 80 are connected integrally with each other by connecting means, namely, fixed jaws 72 and hooks 82. The fixed jaws 72 are formed at each edge of the upper bobbin 70. The hooks 82 are formed at each edge of the lower bobbin 80 for engaging the fixed jaws 72. Therefore, the upper and lower bobbins 70 and 80 are easily connected with each other and detached from each other, and the rotary member 10 is conveniently inserted into the connected bobbins 70 and 80.

A number of holes 77 are formed inwardly from the fixed jaws 72 of the upper bobbin 70 and a number of bosses 87 are formed inwardly from the hooks 82 of the lower bobbin 48 at the corresponding locations of the holes 77 of the upper bobbin 70, so that the upper and lower bobbins 70 and 80 are accurately connected with each other.

The coil 100 generating the magnetic force is wound on the outer surface of the integrally connected bobbins 70 and 80. The upper and lower bobbins 70 and 80 respectively have screen walls 36 and 46 formed at the opposite side ends for preventing the wound coil 100 from slipping out of the bobbins 70 and 80.

Furthermore, the screen walls 76 and 86 prevent that the coil 100 is broken down due to touch of the cap 110 with the coil 100 when the bobbins 70 and 80 on which the coil 100 is wound are fit into the cap 110 or that the covering of the coil 100 comes off.

A magnetic member 79 is disposed in a prescribed location of the outer wall of the upper bobbin 70 or the lower bobbin 80, thereby causing the rotary member 10 to be stopped at a fixed location. In other words, the rotary member 10 being rotated by the external power supply is stopped at the fixed location when the power supply is stopped. In initial rotation, the repulsive power between the magnetic force of the rotary member 10 and that of the coil 100 can be maximized to lead the rotation of the rotary member 10.

Additionally, the upper and lower bobbins 70 and 80 respectively have waist portions 78 and 88 formed at opposite sides of one portion thereof to make the number of winding of the coil 100 wound on the outer surface of the bobbins 70 and 80 differ.

That is, the magnetic force differs depending on the number of winding of the coil 100 wound on the outer surface of the bobbins 70 and 80 to increase the repulsive power to the rotary member 10, thereby rotating the rotary member 100 more effectively.

In the second and third embodiments, when the bobbins has the waist portions formed at one or two portions thereof, it is natural that the fixed jaws and the hooks for connecting integrally the bobbins and the holes and bosses for setting the connected location of the bobbins are formed more inwardly in comparison with those of the first embodiment of the bobbins.

Figure 7A:
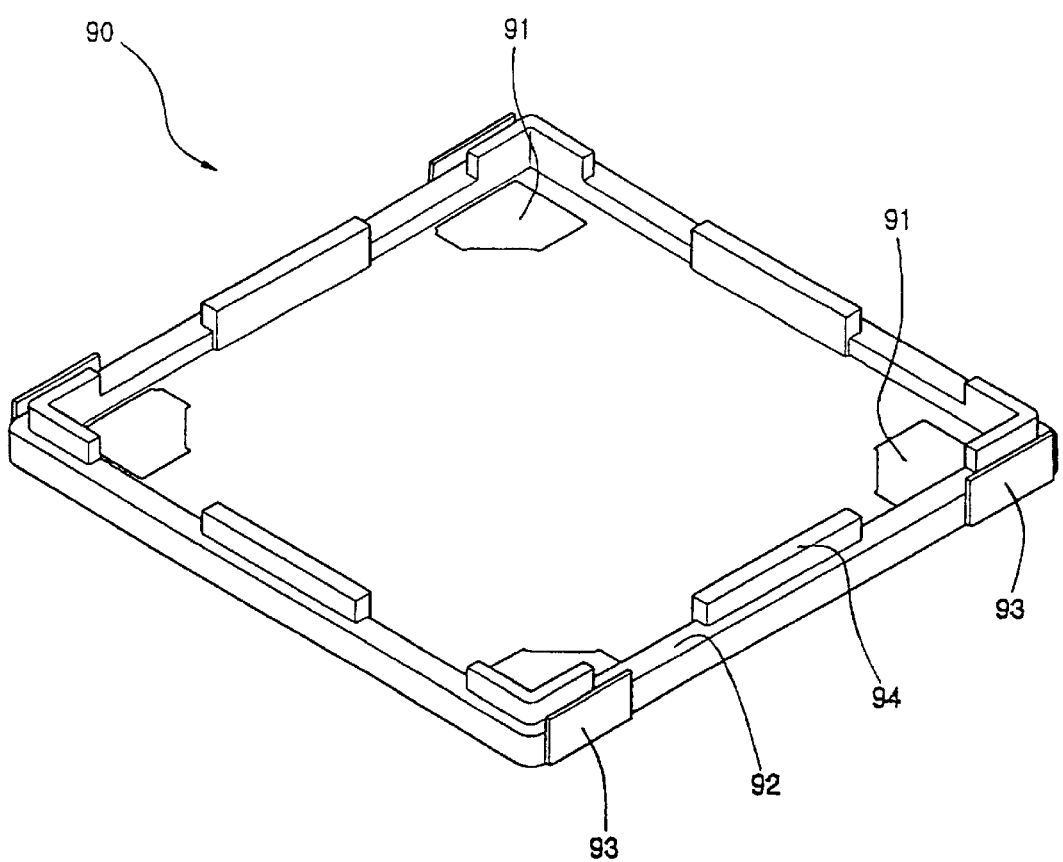
FIG. 7a is a perspective view of a housing applied to the vibrator according to the present invention.
Figure 7B:
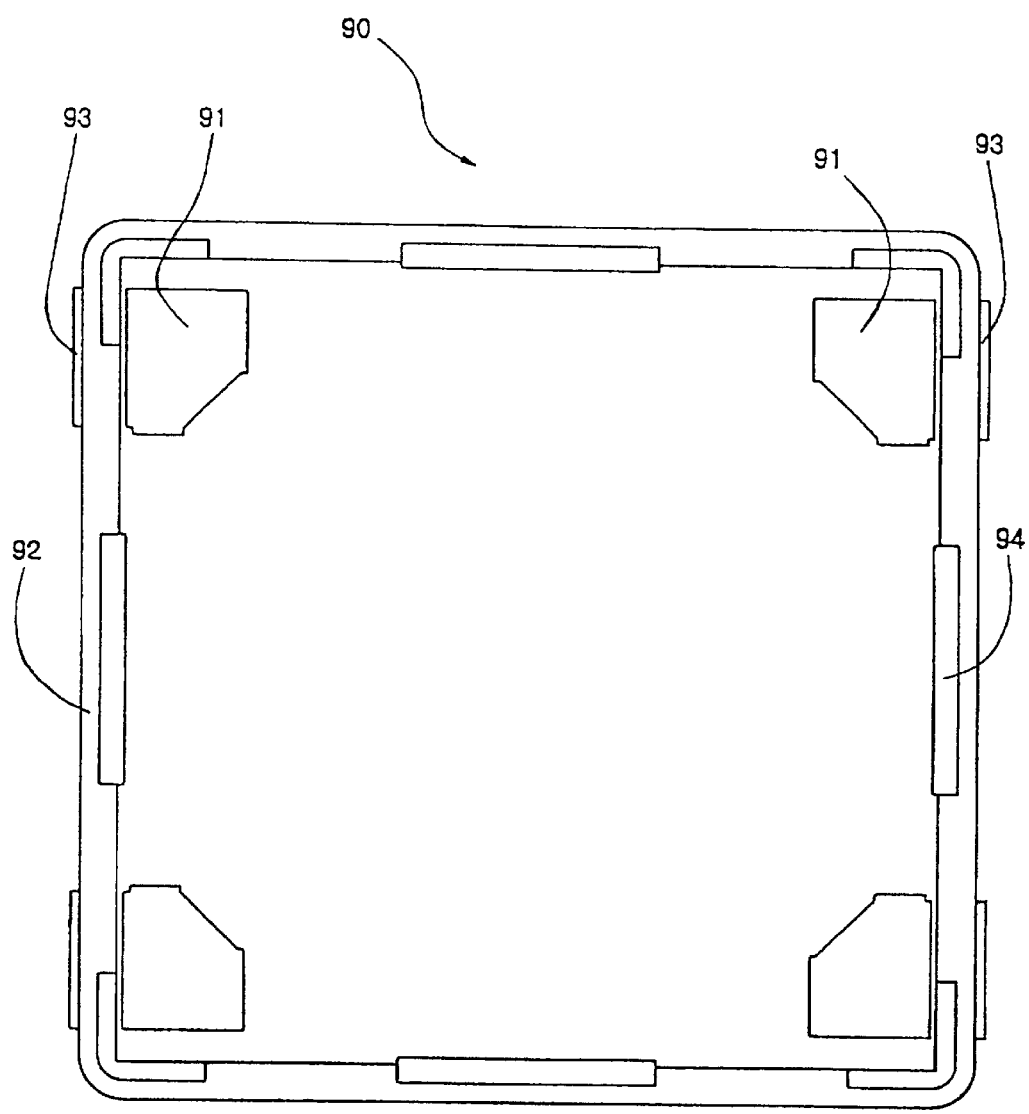
FIG. 7b is a plane view of a housing applied to the vibrator according to the present invention.
Figure 7C:
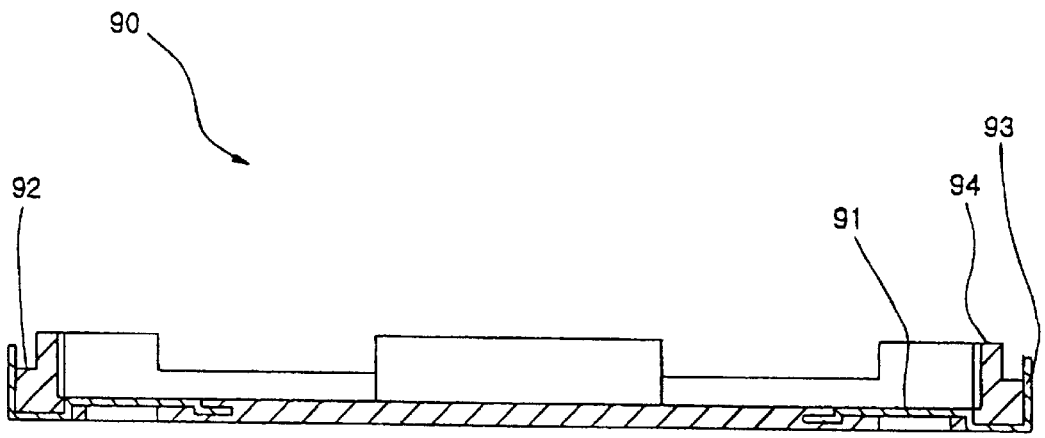
FIG. 7c is a sectional view of the housing applied to the vibrator.
Figure 8:
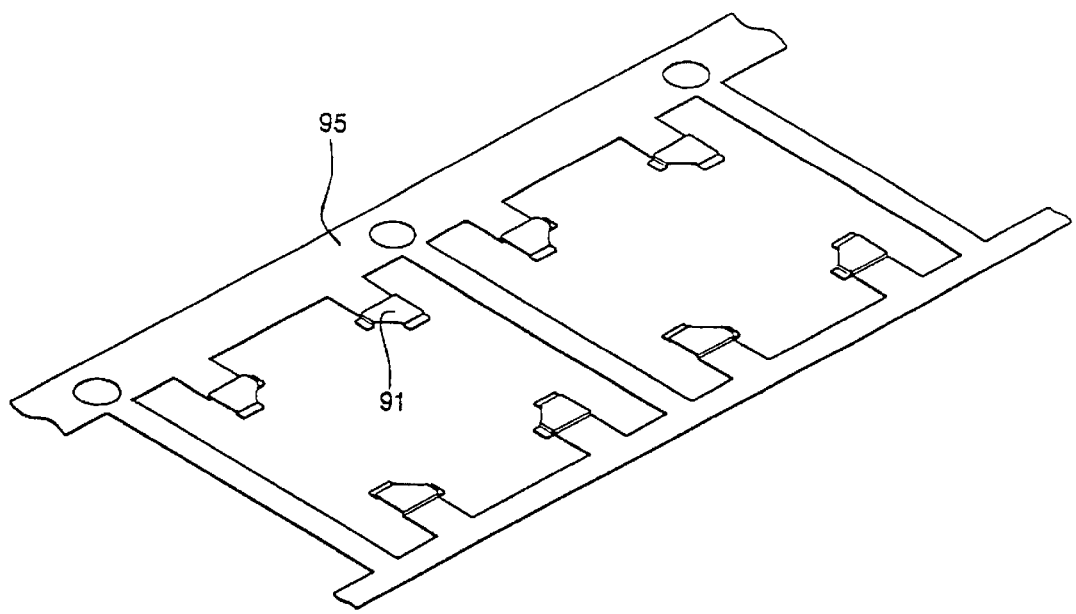
Figure 9A:
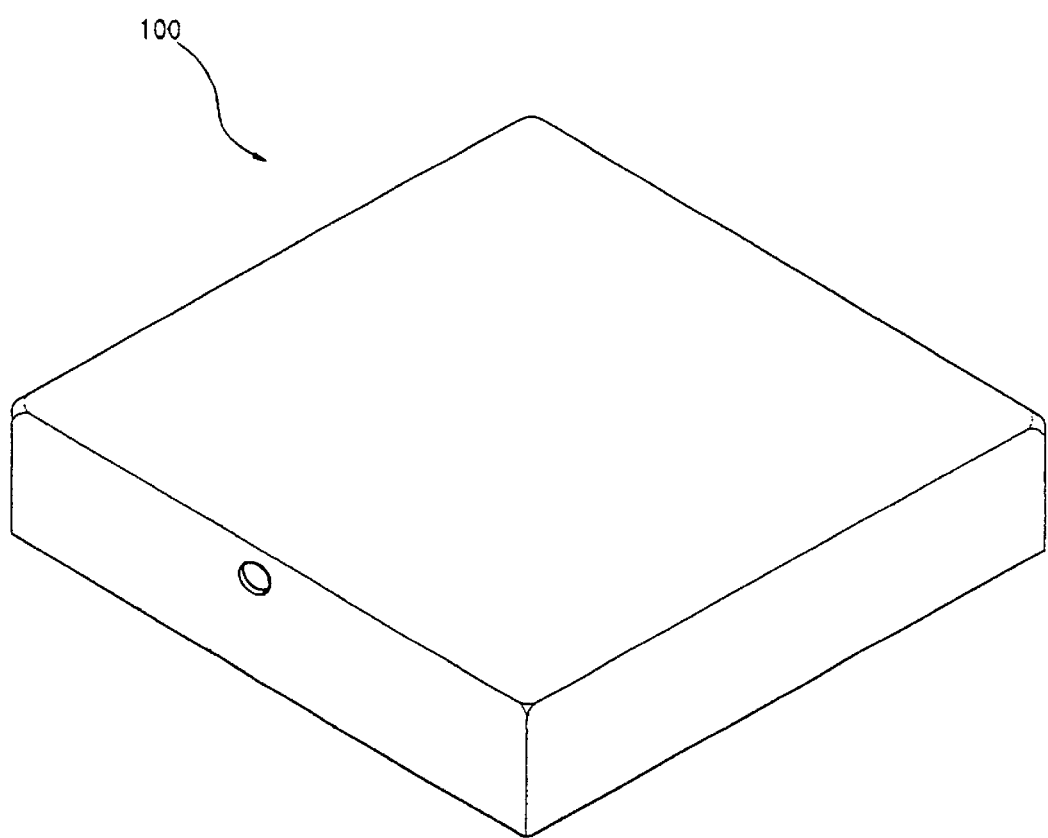
FIG. 9a is a perspective view of a cap applied to the vibrator according to the present invention.
Figure 9B:
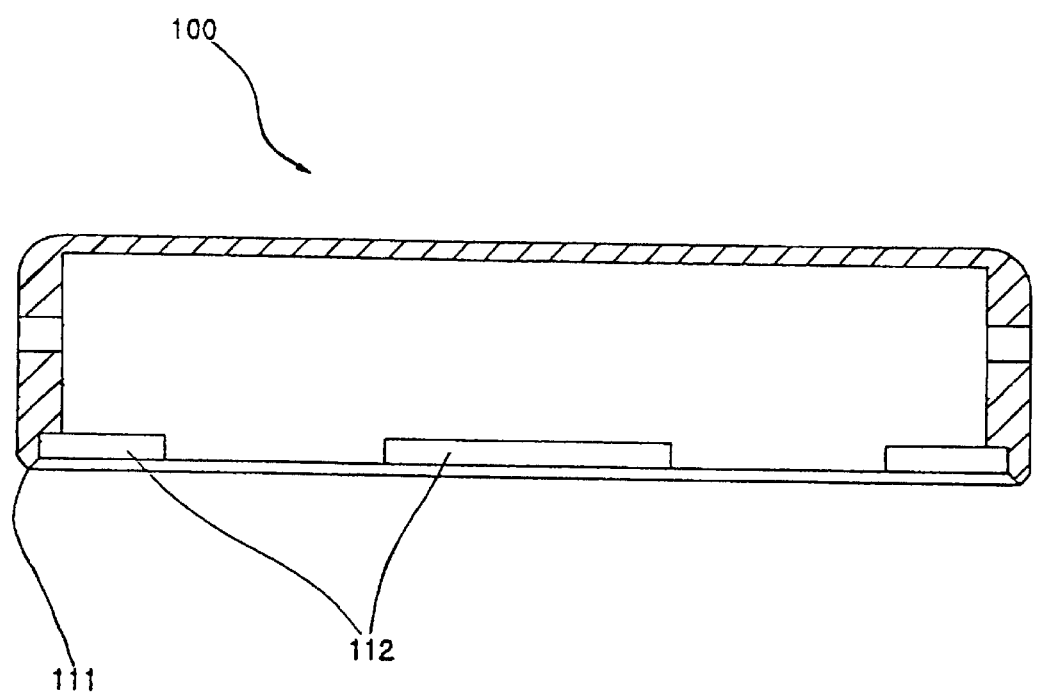
FIG. 9b is a sectional view of the cap applied to the vibrator.
Figure 10:
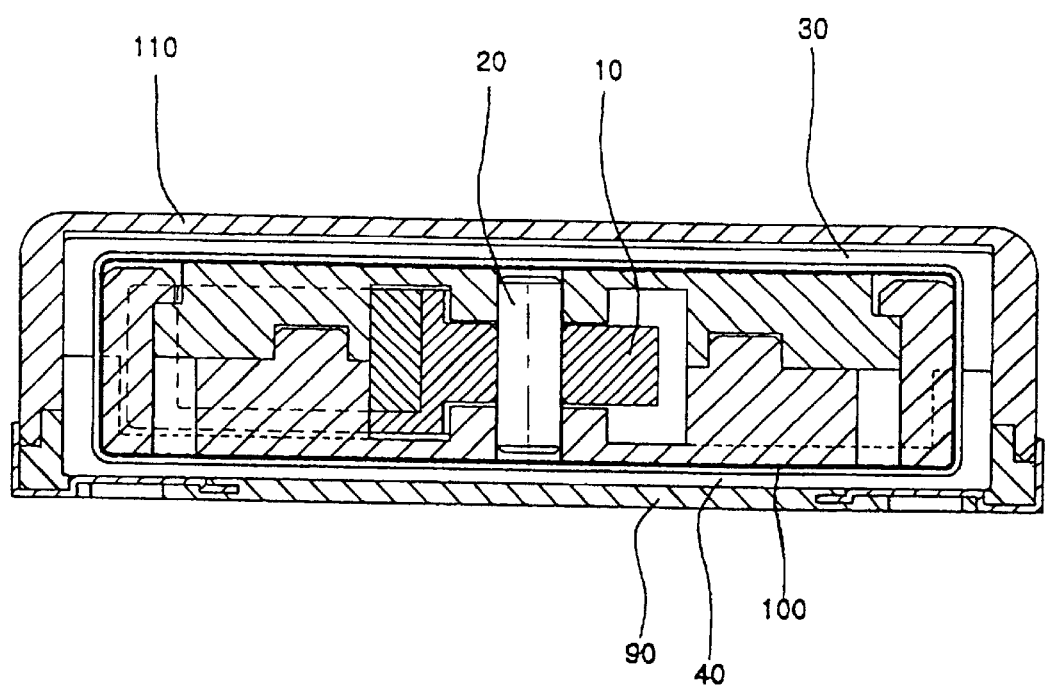
FIG. 10 is a sectional view showing an assembled state of the vibrator.

FIGS. 7a through 7c show the housing 90, which connects both ends of the coil 100 wound on the bobbins to the external power supply. As shown in FIG. 8, terminals 91, which are attached on a fixing member 95, are formed integrally, embedded inside the housing 90. The housing 90 is made of a non-conduction material, differently from the terminals 91.

The terminals 90 formed integrally with the housing 90 are embedded on the corners of the housing 90. The terminals 90 are exposed from the top surface of the housing 90 to be connected to the ends of the coil 100 and exposed from the bottom surface of the housing 90 to be connected to other equipments. Furthermore, each terminal 90 has an extended end 93, which is disposed on the side of the housing 90 and bent upwardly, thereby causing a vibrator to be fixed to the housing 90 without a welding working.

The extended ends 93 of the terminals 91 make a cap 110 easily cover the upper portion of the housing 90 and are separated from the cap 110 at a predetermined interval.

As shown in FIG. 7c, the housing 90 has a number of welding surfaces 92 formed in the same height as the lower end portion of the cap 110 for fitting perfectly the lower end of the cap 110 thereon and a number of bosses 94 formed inwardly from the welding surfaces 92 to be fit into guide grooves 112 of the cap 110.

Especially, the lower end portion of the cap 110 fit into the welding to surface 92 of the housing 90 has a protrusion 111 formed for allowing the cap 110 to be welded integrally with the housing 90 by ultrasonic welding.

Additionally, the cap 110 includes a pair of through holes 113 at opposite sides thereof to thereby smoothly rotate the rotary member 10 inside the bobbins.

The operation of the vibrator with the above structure will be described hereinafter in more detail.

The rotary member 10 rotatably connected on the support holes 34 and 44 of the upper and lower bobbins 30 and 40 through the shaft 20 keeps in a predetermined location by the magnetic member 39 attached on the outer wall of the upper bobbin 30 or the lower bobbin 40. When the external power is supplied to the coil 100, the electric current have the magnetic force produced, thereby causing the rotary member 10 to rotate.

That is, the repulsive power generated between the rotary member 10 made of the Nd magnet or the SmCo magnet and eccentrically disposed in one direction and the coil 100 wound on the bobbins make the rotary member 10 rotate on the shaft 20, whereby the vibrator including the rotary member 10 can be vibrated.

The vibrator, which is compact and operated by low electric power, can be embedded inside communication products such as mobile phones and radio pagers, thereby causing the communication products to be minimized in weight and volume.

Additionally, the vibrator according to the present invention does not use additional eccentric shaft connected to a motor but use the magnet as the eccentric shaft, thereby resulting in reducing the power consumption of the vibrator.

Furthermore, the vibrator is manufacture in a SMD type (Surface Mounting Device type), whereby the vibrator can be simply assembled into the communication products as well as occupy a small confined space.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A vibrator comprising:
    a rotary member having a center plate and a unipolar magnet of an arc shape, the center plate having a through hole formed in the center, the unipolar magnet being eccentrically disposed on the outer surface of the center plate;
    a shaft insertable into the through hole of the center plate;
    upper and lower bobbins connected to each other, each bobbin having a confined space and a support hole for inserting the shaft to rotate the rotary member within the confined space; and
    a coil wound on the bobbins for generating a magnetic force with a polarity opposite of the magnet.

2. A vibrator as claimed in claim 1, wherein the rotary member is a Nd (neodymium) magnet.

3. A vibrator as claimed in claim 1, wherein the rotary member is a SmCo magnet.

4. A vibrator as claimed in claim 1, wherein the rotary member has a plastic magnet embedded in the center thereof.

5. A vibrator as claimed in claim 1, wherein the shaft is embedded integrally inside the rotary member.

6. A vibrator as claimed in claim 1, wherein the shaft is in the form of cylindrical shape and has tapered portions at both ends thereof.

7. A vibrator as claimed in claim 1, wherein the shaft has a projection formed at the center which meets with the surface of the through hole of the center plate and a gear portion formed on the side surface of the projection.

8. A vibrator as claimed in claim 1, wherein the shaft has a projection formed at the center which meets with the surface of the through hole of the center plate and at least one or more plane surfaces formed by completely cutting at least one or more portions of the projection.

9. A vibrator as claimed in claim 1, wherein the shaft has a projection formed at the center which meets with the surface of the through hole of the center plate and at least one or more plane surfaces formed by partially cutting at least one or more portions of the projection.

10. A vibrator as claimed in claim 1, wherein each bobbin includes:
    screen walls formed at sides thereof for preventing the coil wound on the bobbins from slipping out of the bobbins; and
    a coupling device for coupling integrally the upper and lower bobbins.

11. A vibrator as claimed in claim 10, wherein the coupling device includes a number of fixed jaws formed on corners of the upper bobbin and a number of hooks formed on corners of the lower bobbin in corresponding locations of the fixed jaws.

12. A vibrator as claimed in claim 10, wherein each bobbin has air holes formed in sides for leading the flow of air during the rotation of the rotary member.

13. A vibrator as claimed in claim 10, wherein each bobbin has a boss formed around the support hole, the boss being higher than the inner surface of the bobbin.

14. A vibrator as claimed in claim 10, wherein the upper bobbin has holes formed inwardly from the fixed jaws and the lower bobbin has bosses formed inwardly from the hooks in the corresponding location of the fixed jaws, to thereby couple the bobbins together when the bobbins are assembled.

15. A vibrator as claimed in claim 10, wherein magnetic members are embedded into the outer walls of the upper and lower bobbins to designate a stop position of the rotary member.

16. A vibrator as claimed in claim 1, wherein each bobbin includes:
    screen walls formed at sides thereof for preventing the coil wound on the bobbins from slipping out of the bobbins;
    waist portions formed at least one side of the bobbins to adjust the number of winding of the coil; and
    a coupling device for coupling integrally the upper and lower bobbins.

17. A vibrator as claimed in claim 16, wherein the coupling device includes a number of fixed jaws formed on corners of the upper bobbin and a number of hooks formed on corners of the lower bobbin in corresponding locations of the fixed jaws.

18. A vibrator as claimed in claim 16, wherein each bobbin has air holes formed in sides for leading the flow of air during the rotation of the rotary member.

19. A vibrator as claimed in claim 16, wherein each bobbin has a boss formed around the support hole, the boss being higher than the inner surface of the bobbin.

20. A vibrator as claimed in claim 16, wherein the upper bobbin has holes formed inwardly from the fixed jaws and the lower bobbin has bosses formed inwardly from the hooks in the corresponding location of the fixed jaws, to thereby couple the bobbins together when the bobbins are assembled.

21. A vibrator as claimed in claim 16, wherein a magnetic member is embedded into the outer wall of the upper bobbin or the lower bobbin to designate a stop position of the rotary member.

22. A vibrator comprising:
    a rotary member having a center plate and a unipolar magnet of an arc shape, the center plate having a through hole formed in the center, the unipolar magnet being eccentrically disposed on the outer surface of the center plate;

a shaft insertable into the through hole of the center plate;

upper and lower bobbins connected to each other, each bobbin having a confined space and a support hole for inserting the shaft to rotate the rotary member within the confined space; and a coil wound on the bobbins for generating a magnetic force with a polarity opposite of the magnet;

a housing wrapping up the bobbins on which the coil is wound, the housing connecting the ends of the coil to an external power supply; and a cap covering the upper portion of the bobbins, the cap being fixed on the upper surface of the housing.

23. A vibrator as claimed in claim 22, wherein the rotary member is a Nd (neodymium) magnet.

24. A vibrator as claimed in claim 22, wherein the rotary member is a SmCo magnet.

25. A vibrator as claimed in claim 22, wherein the rotary member has a plastic magnet embedded in the center thereof.

26. A vibrator as claimed in claim 22, wherein the shaft is embedded integrally inside the rotary member.

27. A vibrator as claimed in claim 22, wherein the shaft is in the form of cylindrical shape and has tapered portions at both ends thereof.

28. A vibrator as claimed in claim 22, wherein the shaft has a projection formed at the center which meets with the surface of the through hole of the center plate and a gear portion formed on the side surface of the projection.

29. A vibrator as claimed in claim 22, wherein the shaft has a projection formed at the center which meets with the surface of the through hole of the center plate and at least one or more plane surfaces formed by completely cutting at least one or more portions of the projection.

30. A vibrator as claimed in claim 22, wherein the shaft has a projection formed at the center which meets with the surface of the through hole of the center plate and at least one or more plane surfaces formed by partially cutting at least one or more portions of the projection.

31. A vibrator as claimed in claim 22, wherein each bobbin includes:

screen walls formed at sides thereof for preventing the coil wound on the bobbins from slipping out of the bobbins; and a coupling device for coupling integrally the upper and lower bobbins.

32. A vibrator as claimed in claim 31, wherein the coupling device includes a number of fixed jaws formed on corners of the upper bobbin and a number of hooks formed on corners of the lower bobbin in corresponding locations of the fixed jaws.

33. A vibrator as claimed in claim 31, wherein each bobbin has air holes formed in sides for leading the flow of air during the rotation of the rotary member.

34. A vibrator as claimed in claim 31, wherein each bobbin has a boss formed around the support hole, the boss being higher than the inner surface of the bobbin.

35. A vibrator as claimed in claim 31, wherein the upper bobbin has holes formed inwardly from the fixed jaws and the lower bobbin has bosses formed inwardly from the hooks in the corresponding location of the fixed jaws, to couple the bobbins together when the bobbins are assembled.

36. A vibrator as claimed in claim 31, wherein magnetic members are embedded into the outer walls of the upper and lower bobbins to designate a stop position of the rotary member.

37. A vibrator as claimed in claim 22, wherein each bobbin includes:

screen walls formed at sides thereof for preventing the coil wound on the bobbins from slipping out of the bobbins;

waist portions formed at least one side of the bobbins to adjust the number of winding of the coil; and a coupling device for coupling integrally the upper and lower bobbins.

38. A vibrator as claimed in claim 37, wherein the coupling device includes a number of fixed jaws formed on corners of the upper bobbin and a number of hooks formed on corners of the lower bobbin in corresponding locations of the fixed jaws.

39. A vibrator as claimed in claim 37, wherein each bobbin has air holes formed in sides for leading the flow of air during the rotation of the rotary member.

40. A vibrator as claimed in claim 37, wherein each bobbin has a boss formed around the support hole, the boss being higher than the inner surface of the bobbin.

41. A vibrator as claimed in claim 37, wherein the upper bobbin has holes formed inwardly from the fixed jaws and the lower bobbin has bosses formed inwardly from the hooks in the corresponding location of the fixed jaws, to thereby couple the bobbins together when the bobbins are assembled.

42. A vibrator as claimed in claim 37, wherein a magnetic member is embedded into the outer wall of the upper bobbin or the lower bobbin to designate a stop position of the rotary member.

43. A vibrator as claimed in claim 22, wherein the housing has at least two terminals, which are embedded therein and exposed upward and downward from the surface of the housing.

44. A vibrator as claimed in claim 43, wherein an extended end of each terminal is bent upwardly from the side of the housing.

45. A vibrator as claimed in claim 43, wherein an extended end of each terminal is bent upwardly, being separated from the cap, which covers the upper surface of the housing in a predetermined interval.

46. A vibrator as claimed in claim 22, wherein the cap has a projection at the lower end portion for ultrasonic welding, which meets with a welding surface of the upper surface of the housing.

47. A vibrator as claimed in claim 22, wherein the cap has a number of guide holes at the lower end portion thereof and the housing has a number of bosses on the circumference of the housing to be inserted into the guide holes of the cap.

48. A vibrator as claimed in claim 22, wherein the cap has a pair of air holes formed at opposite sides thereof.

* * * * *